(12) United States Patent
Qu et al.

(10) Patent No.: US 8,249,006 B2
(45) Date of Patent: Aug. 21, 2012

(54) METHOD AND APPARATUS FOR ALLOCATING AND PROCESSING SEQUENCES IN COMMUNICATION SYSTEM

(75) Inventors: Bingyu Qu, Shenzhen (CN); Yujuan He, Shenzhen (CN); Xuan Feng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 425 days.

(21) Appl. No.: 12/493,869

(22) Filed: Jun. 29, 2009

(65) Prior Publication Data
US 2009/0303960 A1 Dec. 10, 2009

Related U.S. Application Data

(63) Continuation of application No. PCT/CN2008/070431, filed on Mar. 6, 2008.

(30) Foreign Application Priority Data

| Mar. 7, 2007 | (CN) | 2007 1 0073057 |
|---|---|---|
| Apr. 9, 2007 | (CN) | 2007 1 0100449 |
| Apr. 27, 2007 | (CN) | 2007 1 0103147 |
| Jun. 17, 2007 | (CN) | 2007 1 0112774 |
| Sep. 30, 2007 | (CN) | 2007 1 0123676 |

(51) Int. Cl.
*H04W 4/00* (2009.01)
*H04J 1/00* (2006.01)
*H04J 9/00* (2006.01)
*H04J 3/00* (2006.01)
*H04L 27/00* (2006.01)

(52) U.S. Cl. ........ 370/329; 370/343; 370/204; 370/464; 375/295

(58) Field of Classification Search ............... 370/203, 370/204, 329, 330, 343, 344; 375/259, 260, 375/267, 285, 295, 296, 364, 365, 366, 368
See application file for complete search history.

(56) References Cited

U.S. PATENT DOCUMENTS
7,558,237 B2 * 7/2009 Mottier et al. ............... 370/335
(Continued)

FOREIGN PATENT DOCUMENTS
CN 1728622 A 2/2006
(Continued)

OTHER PUBLICATIONS
Definition of Zadoff-Chu (CAZAC) sequence.*
(Continued)

*Primary Examiner* — Warner Wong
(74) *Attorney, Agent, or Firm* — Brinks Hofer Gilson & Lione (57) ABSTRACT

A method and apparatus for allocating and processing sequences in a communication system is disclosed. The method includes: dividing sequences in a sequence group into multiple sub-groups, each sub-group corresponding to its own mode of occupying time frequency resources; selecting sequences from a candidate sequence collection corresponding to each sub-group to form the sequences in the sub-group by: the sequences in a sub-group i in a sequence group k being composed of n sequences in the candidate sequence collection, the n sequences making a $|r_i/N_i - c_k/N_{p_1}|$ or $|(r_i/N_i - c_k/N_{p_1})$ modu $m_{k,i}|$ function value the smallest, second smallest, till the $n^{th}$ smallest respectively; allocating the sequence group to cells, users or channels. It prevents the sequences highly correlated with the sequences of a specific length from appearing in other sequence groups, thus reducing interference, avoiding the trouble of storing the lists of massive sequence groups.

16 Claims, 4 Drawing Sheets

U.S. PATENT DOCUMENTS

| | | | |
|---|---|---|---|
| 7,808,884 B2* | 10/2010 | Jitsukawa et al. | 370/208 |
| 2008/0090528 A1* | 4/2008 | Malladi | 455/70 |
| 2008/0273582 A1* | 11/2008 | Gaal et al. | 375/224 |
| 2009/0180443 A1* | 7/2009 | Kawasaki et al. | 370/331 |
| 2009/0252112 A1* | 10/2009 | Shimomura et al. | 370/330 |

FOREIGN PATENT DOCUMENTS

| | | |
|---|---|---|
| CN | 1728695 A | 2/2006 |
| CN | 1773897 A | 5/2006 |
| CN | 1815916 A | 8/2006 |
| CN | 101179819 A | 5/2008 |
| CN | 101542935 B | 11/2010 |
| JP | 2007-194751 | 8/2007 |
| JP | 2007-336437 | 12/2007 |
| TW | 291622 B | 12/2007 |
| WO | WO 2008094014 A2 | 8/2008 |

OTHER PUBLICATIONS

International Search Report issued in corresponding PCT Application No. PCT/CN2008/070431; mailed Jun. 19, 2008.
LG Electronics, "Binding Method for UL RS Sequence with Different Lengths" 6.6.2, 3GPP TSG RAN WG1 #48. St. Louis, USA, Feb. 12-16, 2007. R1-070911.
Communication issued in corresponding Chinese Patent Application No. 200880000100.7, mailed Nov. 8, 2011.
Office Action issued in corresponding Japanese Patent Application No. 2009-529504, mailed Dec. 6, 2011.
Office Action issued in corresponding Korean Patent Application No. 10-2009-7008639, mailed Oct. 27, 2010.
Office Action issued in corresponding Japanese Patent Application No. 2009-546637, mailed Sep. 13, 2011.
Written Opinion of the International Searching Authority issued in corresponding PCT Patent Application No. PCT/CN2007/070774, mailed Jan. 10, 2008.
Written Opinion of the International Searching Authority issued in corresponding PCT Patent Application No. PCT/CN2008/070431, mailed Jun. 19, 2008.
Office Action issued in commonly owned U.S. Appl. No. 12/413,105, mailed Jun. 9, 2011.
Office Action issued in corresponding Chinese Patent Application No. 200780001879, mailed Sep. 13, 2011.
Office Action issued in corresponding Chinese Patent Application No. 200880000100.7, mailed Nov. 8, 2011.
Extended European Search Report issued in corresponding European Patent Application No. 07816965.3, mailed Apr. 7, 2010.
Office Action issued in corresponding Australian Patent Application No. 2007308605, mailed Apr. 30, 2010.
Extended European Search Report issued in corresponding European Patent Application No. 11004069.8, mailed Aug. 29, 2011.
Office Action issued in corresponding Chinese Patent Application No. 200780001879.X, mailed Jun. 5, 2009.
Office Action issued in corresponding Chinese Patent Application No. 200780001879.X, mailed Jul. 20, 2011.
Extended European Search Report issued in corresponding European Patent Application No. 08715167.6, mailed Apr. 7, 2010.
Popović et al, "Random Access Preambles for Evolved UTRA Cellular System" 2006 IEEE Ninth International Symposium on Spread Spectrum Techniques and Applications, 2006.
Ng et al., "Multi-phase Optimal Sequences for Fast Initialization of Channel Estimation and Equalization" IEEE 1997.
Nortel Networks, "Consideration on UL RACH Scheme for LTE" Agenda Item 13.2.3.1, 3GPP RAN1 Meeting #44. Denver, USA, Feb. 2006. R1-060653.
Nortel, "Consideration on UL RACH Scheme for LTE" Agenda Item 5.2.3.1, 3GPP RAN1 LTE Ad Hoc Meeting. Helsinki, Finland, Jan. 23-25, 2006. R1-060152.
Qualcomm Europe, "UL Reference Signal Design" Agenda Item 6.4.2, 3GPP TSG RAN1 #47. Riga, Latvia, Nov. 6-10, 2006. R1-063434.
Lucent Technologies, "Precoded FDM Reference Signals for SC-FDMA" Agenda Item 6.4 Uplink Reference Signals, 3GPP TSG-RAN WG1 LTE adhoc. Cannes, France, Jun. 2006. R1-061876.
LG Electronics, "Binding Method for UL RS Sequence with Different Lengths" Agenda Item 6.6.2, 3GPP TSG RAN WG1 #48. St. Louis, USA, Feb. 12-16, 2007. R1-070911.
LG Electronics, "Binding Method for UL RS Sequence with Different Lengths" Agenda Item 7.10.2, 3GPP TSG RAN WG1 #48bis. St. Julians, Malta, Mar. 26-30, 2007. R1-071542.
Motorola, "Random Access Sequence Design" Agenda Item 10.2.3, 3GPP TSG RAN1 #44-bis. Athens, Greece, Mar. 24-26, 2006. R1-060884.
Office Action issued in corresponding Chinese Patent Application No. 201010230652.6, mailed Feb. 17, 2012.
Office Action issued in corresponding European Application No. 07816965.3, mailed Mar. 7, 2012.
Motorola, "EUTRA SC-FDMA Uplink Pilot/Reference Signal Design & TP" Agenda Item 8.4.2. 3GPP RAN WG1 #46, Tallinn, Estonia, Aug. 28-Sep. 1, 2006. R1-062073.
3rd Generation Partnership Project, "Technical Specification Group Radio Access Network; Physical Layer Aspects for Evolved Universal Terrestrial Radio Access (UTRA)" (Release 7) 3GPP TR 25.814, V7.0.0. Jun. 2006.
3rd Generation Partnership Project, "Technical Specification Group Radio Access Network; Physical Layer Aspects for Evolved Universal Terrestrial Radio Access (UTRA)" (Release 7) 3GPP TR 25.814, V7.1.0. Sep. 2006.
Lucent Technologies, "CAZAC Reference Signals for SC-FDMA" Agenda Item 8.4.2. 3GPP TSG RAN WG1 Meeting #46, Tallinn, Estonia, Aug. 28-Sep. 1, 2006. R1-062388.
NTT DoCoMo et al., "Multiplexing Method for Orthogonal Reference Signals for E-UTRA Uplink" Agenda Item 8.4.2. 3GPP TSG RAN WG1 Meeting #46, Tallinn, Estonia, Aug. 28-Sep. 2006.
Catt, "EUTRA SC-FDMA Uplink Reference Signal Design" Agenda Item 8.4.2. 3GPP TSG RAN WG1 Meeting #46, Tallinn, Estonia, Aug. 28-Sep. 1, 2006. R1-062299.

* cited by examiner

METHOD AND APPARATUS FOR ALLOCATING AND PROCESSING SEQUENCES IN COMMUNICATION SYSTEM

CROSS-REFERENCE TO RELATED APPLICATION

This application is a continuation of International Application No. PCT/CN2008/070431, filed on Mar. 6, 2008, titled "sequence distributing, processing method and apparatus in communication system", which claims the priority of CN application No. 200710073057.4, filed on Mar. 7, 2007, titled "method and apparatus for allocating and processing sequences", CN application No. 200710100449.5, filed on Apr. 9, 2007, titled "method and apparatus for allocating and processing sequences", CN application No. 200710103147.3, filed on Apr. 27, 2007, titled "method and apparatus for allocating and processing sequences in wireless communication system", CN application No. 200710112774.3, filed on Jun. 17, 2007, titled "method and apparatus for allocating and processing sequences in communication system", and CN application No. 200710123676.X, filed on Sep. 30, 2007, titled "method and apparatus for allocating and processing sequences in communication system", the contents of all of which are incorporated herein by reference.

FIELD OF THE APPLICATION

The present application relates to the communication field, and in particular, to a technology for allocating and processing sequences in a communication system.

BACKGROUND OF THE APPLICATION

In the communication system, the Constant Amplitude Zero Auto-Correlation (CAZAC) sequence is a very important communication resource. The specific features are as follows:

The modulo of the amplitude is a constant value, for example, normalized to 1; and Zero periodical-auto-correlation: except the maximum correlation with the sequence itself, the auto correlation with other cyclic shift of this sequence is zero.

The CAZAC sequence has the above features. Therefore, after Fourier transformation, the sequence in the frequency domain is also a CAZAC sequence. The sequence of this feature may be used as a reference signal for channel estimation in the communication.

For example, in a Single Carrier Frequency Division Multiple Access (SC-FDMA) system, within a symbol time, the elements of the CAZAC sequence are transmitted sequentially on multiple sub-carriers. If the receiver knows the sequence of the transmitted signals, the receiver may perform channel estimation by using the received signals. The transmitted signals have equal amplitudes on every sub-carrier on the frequency domain. Therefore, the receiver may estimate out the channel fading on each sub-carrier fairly. In addition, due to the constant amplitude feature of the CAZAC sequence on the time domain, the peak-to-average value of the transmitted waveform is relatively low, which facilitates transmitting.

In another example, the random access preamble signals in the SC-FDMA system may be made of CAZAC sequences. The preamble sequence of the random access signals may be modulated on the frequency domain sub-carrier, and transformed onto the time domain through Fourier transformation before being transmitted. In this way, through high auto correlation and cross correlation of the CAZAC sequence, little interference exists between the random access preamble signals of different cells and different users.

A CAZAC signal is manifested as a CAZAC signal on both the time domain and the frequency domain. Therefore, the CAZAC signals may also be modulated directly into signals on the time domain that occupies certain bandwidth before being transmitted.

The CAZAC sequence comes in many types. A common type is Zadoff-Chu sequence. Other types include: Generalized Chirplike Sequence (GCL) and Milewski sequence. Taking the Zadoff-Chu sequence as an example, the generation mode or expression of a Zadoff-Chu sequence is as follows:

$$a_{r,N}(k) = \begin{cases} \exp\left[-\frac{j2\pi \cdot r}{N}\left(q \cdot k + \frac{k \cdot (k+1)}{2}\right)\right] & N \text{ is an odd number,} \\ & k = 0, 1, \ldots, N-1 \\ \exp\left[-\frac{j2\pi \cdot r}{N}\left(q \cdot k + \frac{k^2}{2}\right)\right] & N \text{ is an even number,} \\ & k = 0, 1, \ldots, N-1 \end{cases} \quad \text{Formula (1)}$$

wherein r is a parameter generated by the sequence and is relatively prime to N, and q is an integer. When the value of r varies, the sequence differs. r is named as a basic sequence index, and q corresponds to different cyclic shifts. That is, the r value determines the basic sequence, and the q value determines different cyclic shifts of the same basic sequence. The sequence generated by different cyclic shifts of a sequence is known as a cyclic shift sequence generated by the same basic sequence. For two different r values such as r=u,r=v, when (u−v) is relatively prime to N, the two sequences are highly cross-correlated. When N is a prime number, r=1, 2, ..., N−1, and N−1 different CAZAC sequences are generated. Such sequences are highly cross-correlated. In the above example, when N is a prime number, the absolute value of cross correlation normalized between the two sequences is $\sqrt{N}$. The conjugate of the Zadoff-Chu sequence is also a CAZAC sequence.

In a general cellular communication system, when a cell selects a sequence for modulation and transmission, another cell needs to select another sequence having the feature of low cross correlation. For example, in the case of using a Zadoff-Chu sequence, if N is a prime number, each cell selects a different r value, thus ensuring low cross correlation and low interference.

The modulated signals transmitted by a cell may also adopt the fragments of the old sequence or repeat cyclically, which also maintains the auto correlation and cross correlation features of the old sequence properly. Particularly, when the number of sub-carriers that bear the sequence in the cell is not a prime number, it is necessary to select the sequence whose length is equal to the prime number around the number of sub-carriers, and the desired sequences are obtained through segmentation or cyclic extension of the sequences before being transmitted. In the following description, the operations of segmentation or cyclic extension of the sequence are omitted.

Figure 1:
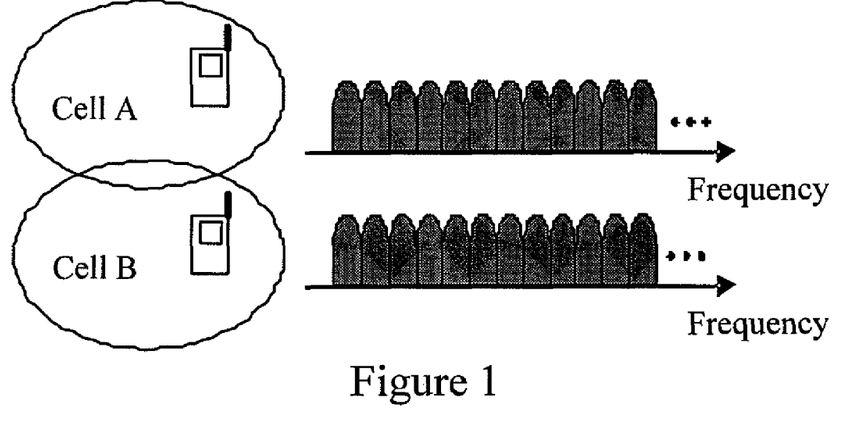
FIG. 1 shows the conventional art where the sequences transmitted by different cells occupy the same time frequency resources and have the same length.

When the signals of multiple sequences transmitted by different cells occupy the same time frequency resource, the sequences transmitted by cell A and cell B have the same length, as shown in FIG. 1. For example, two different Zadoff-Chu sequences whose length is a prime number N may be selected. When the basic sequence index of one sequence is different from that of the other, the two sequences are little correlated, and the transmitted signals of different cells are little mutual-interfering.

Figure 2:
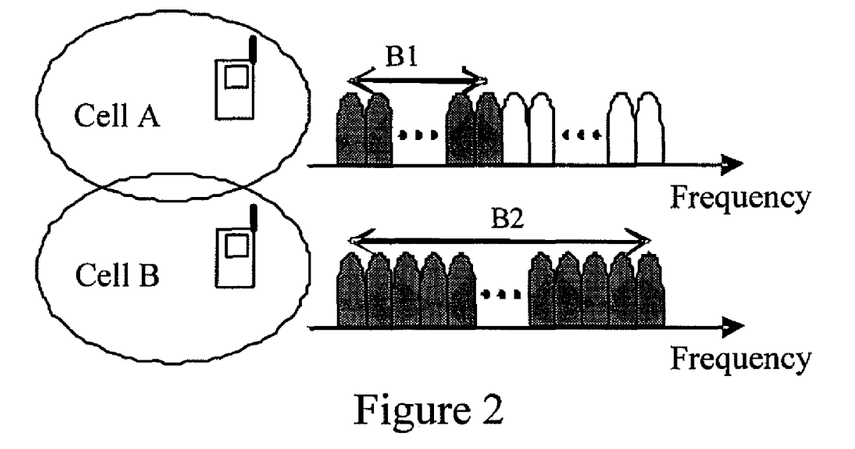
FIG. 2 shows the conventional art where the sequences transmitted by different cells occupy partially overlapped time frequency resources and have different lengths.

As shown in FIG. 2, when the signals of the modulated sequence occupy different time frequency resources, some users of cell A transmit sequence-modulated signals on the radio resource with bandwidth B1; meanwhile, some users of cell B transmit sequence-modulated signals on the radio resource with bandwidth B2, and the time frequency resources of the two parts overlap. In the system shown in FIG. 2, all cells have the same sub-carrier width. Within bandwidth B1, 36 sub-carriers exist. Within bandwidth B2, 144 sub-carriers exist. Because the sequence is mapped onto a sub-carrier, the length of the sub-carrier corresponds to the length of the sequence. Evidently, the two cells need to select sequences of different lengths respectively. In this case, the cross interference may be strong between the long sequence and the short sequence, and the sequence planning becomes relatively complex. In the example shown in FIG. 2, only sequences of two lengths exist. In practice, depending on the size of different radio resources occupied by a user's transmission, more sequences of different lengths may exist, and the complexity is higher.

The foregoing modulated signals of the sequences that occupy different time frequency resources occur frequently in the SC-FDMA system. Because the sequence serves as a reference signal and provides the channel estimation required by data demodulation, the sequence is transmitted along with the bandwidth resources of the data. The data bandwidth of the user may have different bandwidth values and locations at different times according to specific scheduling rules. Therefore, the sequence of the reference signal of each different cell occupies the time frequency resources in a way that is frequently changing, and the interference between cells is affected by the correlation of sequences of different lengths. To make matters worse, the system generally uses the shift correlation feature of sequences, obtains multiple code division quadrature sequences through different cyclic time shifts, and allocates them to different users. Therefore, once strong interference occurs between the sequences of two lengths, the users who use the sequences of the two lengths may interfere with each other strongly.

Nevertheless, the modes of the sequence occupying the time frequency resources are not limited to the foregoing examples. For example, sequences of different lengths may be modulated on the time domain at the same sampling frequency, which also brings the issue of correlation between the long sequence and the short sequence. Alternatively, the sequence may occupy the frequency domain sub-carriers at different sub-carrier intervals, or occupy the time sampling points at different time sampling intervals. In other words, the sequence is not modulated on all sub-carriers/sampling points, but modulated at regular intervals equivalent to a specific number of sub-carriers/sampling points.

To sum up, when the sequence occupies the time frequency resource in different modes, the interference among cells is relatively complex. Particularly, when sequences of different lengths exist, the sequences of each length need to be planned separately, and the interference among sequences with different length needs to be considered in a system with multiple cells.

SUMMARY OF THE APPLICATION

An embodiment of the present application provides a method for allocating sequences in a communication system. The method includes:

dividing sequences in a sequence group into multiple sub-groups, where each sub-group corresponds to its own mode of occupying time frequency resources;

selecting sequences from a candidate sequence collection corresponding to each sub-group to form sequences in the sub-group in this way: the sequences in a sub-group i (i is a serial number of the sub-group) in a sequence group k (k is a serial number of the sequence group) are composed of n (n is a natural number) sequences in the candidate sequence collection, where the n sequences make the $|r_i/N_i - c_k/N_{p_1}|$ or $|(r_i/N_i - c_k/N_{p_1}) \bmod m_{k,i}|$ function value the smallest, second smallest, till the $n^{th}$ smallest respectively; $N_{p_1}$ is the length of a reference sub-group sequence, $c_k$ is a basic sequence index of a sequence with a length of $N_{p_1}$ determined by the sequence group k; $r_i$ is a basic sequence index in the candidate sequence collection, and $N_i$ is the length of a sequence in the candidate sequence collection; $m_{k,i}$ is a variable dependent on the group number k and the sub-group number i; and allocating the sequence groups to the cells, users or channels.

A method for processing sequences provided in an embodiment of the present application includes:

obtaining a group number k of a sequence group allocated by the system;

selecting n (n is a natural number) sequences from a candidate sequence collection to form sequences in a sub-group i (i is a serial number of the sub-group) in a sequence group k, where the n sequences make the $|r_i/N_i - c_k/N_{p_1}|$ or $|(r_i/N_i - c_k/N_{p_1}) \bmod m_{k,i}|$ function value the smallest, second smallest, till the $n^{th}$ smallest respectively, $N_{p_1}$ is the length of a reference sub-group sequence, $c_k$ is a basic sequence index of a sequence with a length of $N_{p_1}$ determined by the sequence group k; $r_i$ is a basic sequence index in the candidate sequence collection, and $N_i$ is the length of a sequence in the candidate sequence collection; $m_{k,i}$ is a variable dependent on the group number k and the sub-group number i; and generating a corresponding sequence according to the sequences in the formed sub-group, and transmitting or receiving the sequences on the time frequency resources corresponding to the sub-group i.

An apparatus for processing sequences provided in an embodiment of the present application includes:

a sequence selecting unit, adapted to: obtain a group number k of a sequence group allocated by the system, and select n (n is a natural number) sequences from a candidate sequence collection to form sequences in a sub-group i (i is a serial number of the sub-group) in the sequence group k (k is a serial number of the sequence group), where the n sequences make the $|r_i/N_i - c_k/N_{p_1}|$ or $|(r_i/N_i - c_k/N_{p_1}) \bmod m_{k,i}|$ function value the smallest, second smallest, and the $n^{th}$ smallest respectively, $N_{p_1}$ is the length of a reference sub-group sequence, $c_k$ is a basic sequence index of a sequence with a length of $N_{p_1}$ determined by the sequence group k; $r_i$ is a basic sequence index in the candidate sequence collection, and $N_i$ is the length of a sequence in the candidate sequence collection; $m_{k,i}$ is a variable dependent on the group number k and the sub-group number i; and a sequence processing unit, adapted to: generate a corresponding sequence according to the sequences in the formed sub-group i, and process the sequences on the time frequency resources corresponding to the sub-group I, where the processing includes transmitting and receiving.

DETAILED DESCRIPTION OF THE APPLICATION

A detailed description of the present application is provided hereunder with reference to accompanying drawings and preferred embodiments.

In the Chinese application No. 200610173364.5, which was filed with the State Intellectual Property Office of the People's Republic of China by Huawei Technologies Co., Ltd. on Dec. 30, 2006, a method is provided to overcome the sequence interference caused by different modes of occupying time frequency resources by grouping sequences. The method shows: the sequences in a group are multiple sequences corresponding to different modes of occupying time frequency resources; the strongly correlated sequences are included into a group, and the correlation between different groups is relatively low; and then the sequence groups are allocated among the cells. The strongly correlated sequences are in the same group, and the sequences in the same group are used only in this group. The sequence groups used by different cells are little correlated with each other, thus avoiding strong correlation in the case of using sequences of different lengths in different cells.

The strongly correlated sequences are included into a group. Generally, the composition of all sequences of each group may be stored. When a cell user or channel wants to use a sequence corresponding to a mode of occupying time frequency resources in the allocated sequence group, the desired sequence may be found in the stored sequence group. However, the formation of the sequence group needs a pre-stored table. If the size of the sequence group becomes greater, the storage occupies a huge space, and the searching is time-consuming. The extra storage increases the complexity and wastes hardware resources.

Embodiment 1

In this embodiment, the system allocates sequence groups to the cell, user or channel. The sequences in each sequence group are divided into multiple sequence sub-groups. Each sequence sub-group corresponds to a mode of occupying time frequency resources. In the communication system, each mode of occupying time frequency resources corresponds to a sequence sub-group uniquely. The sequences in each sub-group are selected from the candidate sequence collection corresponding to the sub-group in a specific selection mode. According to the allocated sequence group and the mode of occupying time frequency resources used for the specific transmit signals, the user or channel selects the sequences in the sequence sub-group corresponding to the mode of occupying the time frequency resources of the transmit signals in the allocated sequence group for transmitting or receiving.

A certain selection mode can be: for a random sub-group i, determining a function $f_i(\cdot)$ corresponding to the sub-group, where the domain of the function is the candidate sequence collection corresponding to the sub-group; determining n sequences from the candidate sequence collection to form sequences, n is a natural number, in the sub-group i, i is a serial number of the sub-group, in the sequence group k, k is the serial number of the sequence group, where the n sequences make the $f_i(\cdot)$ function value the smallest, second smallest, and third smallest respectively, d(a,b) is a two variables function, and $G_k$ is a variable determined by the group number k. This selection mode is equivalent to: selecting n sequences from the candidate sequence collection to make the $d(f_i(\cdot), G_k)$ of all other sequences greater than $d(f_i(\cdot), G_k))$ of these n sequences.

The foregoing sequence selection mode is described below, taking a Zadoff-Chu sequence, namely, $a_{r,N}(z)$, in the CAZAC sequence as an example:

Each sequence group is composed of M sub-groups. The candidate sequence collection of sub-groups 1, 2, . . . , M includes the Zadoff-Chu sequences whose lengths are $N_1$, $N_2$, . . . , $N_M$. The Zadoff-Chu sequence whose length is $N_i$, namely, the $a_{r_i,N_i}(z)$, z=0, 1, . . . , $N_i$–1 sequence, has $N_i$–1 different basic sequences, depending on $r_i$=1, 2, . . . , $N_i$–1. Specifically, the function corresponding to the sub-group i (namely, the sub-group i corresponding to the Zadoff-Chu sequence whose length is $N_i$) is $f_i$: $\{a_{r_i,N_i}(z)\}_{z=0, 1, 2, \ldots, N_i-1} \to r_i/N_i$. The domain of this function is a candidate sequence collection corresponding to the sub-group i. $r_i$ is an index of the Zadoff-Chu sequence in the candidate sequence collection, and $N_i$ is the length of the Zadoff-Chu sequence in the candidate sequence collection.

For the sequence group k=1, 2, . . . , the sub-group numbered $p_1$ is selected as a reference sub-group. The foregoing $G_k$ is defined as $G_k=f_{p_1}(\{a_{c_k,N_{p_1}}(z)\}_{z=0, 1, \ldots, N_1-1})=c_k/N_{p_1}$, $N_{p_1}$ is the length of the reference sub-group sequence, and $c_k$ is a basic sequence index of the sequence with a length of $N_{p_1}$ determined by the sequence group k. Particularly, if $c_k$=k is selected, then $G_k=f_{p_1}(\{a_{k,N_{p_1}}\})=k/N_{p_1}$.

If the foregoing function d(a,b) is defined as |a−b|, the sequence that makes the $d(f_{p_1}(\cdot), G_k)=d(f_{p_1}(\cdot), f_{p_1}(\{a_{k,N_{p_1}}\}))$ value the smallest in the sub-group numbered $p_1$ in the sequence group k is the $\{a_{k,N_{p_1}}\}$ sequence with the index of $r_{p_1}$=k and length of $N_{p_1}$. In this case, $d(f_{p_1}(\cdot), G_k)$=0.

The sequences in the sub-group i=m in the sequence group k are n sequences that have the length of $N_m$ and make the $|r_m/N_m - k/N_{p_1}|$ value the smallest, second smallest, and third smallest respectively, namely, n sequences that make the $d(f_m(\cdot), f_{p_1}(\{a_{k,N_{p_1}}\}))$ value smaller, where n is a natural number dependent on k and m.

The foregoing embodiment reveals that: the sequences (for example, i=m, j=$p_1$) in at least two sub-groups i and j in at least one sequence group k are n (n is a natural number dependent on k, i, and j) sequences selected from the candidate sequence collection and make the value of the function $d(f_i(\cdot), f_j(\cdot))$ such as the foregoing $d(f_m(\cdot), f_{p_1}(\{a_{k,N_{p_1}}\}))$ smallest, second smallest, and third smallest respectively.

This embodiment is introduced below, taking a non-CAZAC sequence such as a Gauss sequence which has high auto correlation and cross correlation features as an example. A formula for generating a Gauss sequence is:

$$b_{\alpha_1, \alpha_{l-1}, \ldots, \alpha_0}(n) = \exp(-2\pi j(\alpha_l n^l + \alpha_{l-1} n^{l-1} + \ldots + \alpha_0)),$$
$$n=0, 1, 2, \ldots, N \quad \text{Formula (2)}$$

In formula (2), $n^l$ is the highest-order item of the Gauss sequence, l is the highest order, and the value range of l is a positive integer. If l=2, $\alpha_2$=r/N, where N is a positive integer.

If $N=2N_1$ and $\alpha_1=r(N_1 \mod 2)/N+2r/N\cdot p$, the Gauss sequence is equivalent to a Zadoff-Chu sequence $\alpha_{r,N_i}(n)$ whose indexes are $r,N_1$. if $l>2$, different $\alpha_l=r/(Nl)$, $r=1, 2, \ldots, N-1$ values correspond to different Gauss sequence groups, and each group has multiple sequences which depend on the lower-order coefficients $\alpha_{l-1}, \alpha_{l-2}, \ldots$. In this case, the Gauss sequence is not a CAZAC sequence, but has high auto correlation and cross correlation features. In this embodiment, $a_{r,N}(n)$ is used to represent multiple sequences $b_{\alpha_1, \alpha_{l-1}, \ldots, \alpha_0}(n)$ of $\alpha_l=r/(lN)$. One of such sequences is defined as a basic sequence.

For a Gauss sequence $\alpha_{r,N}(z)$, the function corresponding to the sub-group i may be defined as $f_i: \{a_{r_i,N_i}(z)\}_{z=0, 1, 2, \ldots, N_i-1} \to r_i/N_i$. The domain of this function is a candidate sequence collection corresponding to the sub-group i. In the function, $r_i$ is an index of the Gauss sequence in the candidate sequence collection, and $N_i$ is the length of the Gauss sequence in the candidate sequence collection.

The function $d(a,b)$ corresponding to the Gauss sequence may be $d(a,b)=|(a-b) \mod 1|$, where the modu 1 operation is defined as making the modulo value included in $(-½, ½]$.

Particularly, for the Zadoff-Chu sequence which can be construed as a special example of the Gauss sequence, if the basic sequence index is $r=-(N-1)/2, \ldots, -1, 0, 1, \ldots, (N-1)/2$ because $|a-b|<½$ the modu 1 operation is not required.

However, for general Gauss sequences such as $r=1, 3, 5, \ldots, N_1-2, N_1+2, \ldots, 2N_1-1$, $N=2N_1$, $l=2$, $\alpha_2=r/(2N_1)$, $\alpha_1=0$, and $a_{r,N}(z)_{z=-(N_1-1)/2, \ldots, -1, 0, 1, 2, \ldots, (N_1-1)/2}$, $d(a,b)=|(a-b) \mod 1|$ is required. In other words, $d(f_i, f_j)$ of the sequences corresponding to $\alpha_2=r_i/(2N_i)$ and the sequences corresponding to $\alpha_2=r_j/(2N_j)$ is $$d(f_i, f_j) = |r_i/N_i - r_j/N_j \mod 1| = \left|\frac{(r_iN_j - r_jN_i) \mod N_iN_j}{N_iN_j}\right|,$$

where the modu $N_iN_j$ operation is defined as making the modulo value included in $(-N_iN_j/2, N_iN_j/2]$ If $l=3$ and $d(f_i, f_j)$ of the sequences corresponding to $\alpha_3=r_i/(3N_i)$ and the sequences corresponding to $\alpha_3=r_j/(3N_j)$ is $d(f_i,f_j)=|(r_i/N_i - r_j/N_j) \mod 1|$ and $l=4, 5, \ldots$, the processing is similar.

The Gauss sequence may be defined in another way. If $\alpha_l=r_i/N$, and $\alpha_{r_i,N}$ is used to represent the corresponding Gauss sequence, then the foregoing $f_i$ of the function is defined as $f_i: a_{r_i,N_i}(Z) \to r_i/N_i$, and the function $d(a,b)$ is defined as $d(a,b)=|(a-b) \mod 1/l|$, where the modu $1/l$ operation makes $-1(2l)<(a-b) \mod 1/l \leq 1(2l)$. Therefore, the definition of the two types of Gauss sequences generates the same sequence group. The definition of such a measurement function is also applicable to the Zadoff-Chu sequence.

In another embodiment, if the mode of occupying time frequency resources is that the sequence is modulated on the radio resource whose sub-carrier interval (or time domain sampling interval) is s, then the function corresponding to the sub-group with the interval s is: $f_{N_i}: \{a_{s^2 r_i, N_i}(z)\}_{z=0, 1, 2, \ldots, N_i-1} \to r_i/N_i$, where s is the sub-carrier (or time domain sampling) interval of the radio resource. For a Gauss sequence, the function is $f_{N_i}: \{a_{s^l r_i, N_i}(z)\}_{z=0, 1, 2, \ldots, N_i-1} \to r_i/N_i$, where l is the highest order of the Gauss sequence.

The foregoing reference sub-group is set according to multiple factors. A sub-group of a specific sequence length may be selected as a reference sub-group. Preferably, the sub-group with the minimum sequence length in the system is selected as a reference sub-group. The quantity of available sequence groups in the system is the same as the quantity of sequences of this length. Therefore, shorter sequences do not appear repeatedly in different sequence groups. For example, supposing the shortest sequence length according to the resource occupation mode is 11 in the system, then in the foregoing method, $N_{p_1}=N_1=11$. In this case, 10 sequence groups are available in the system.

Alternatively, the sub-group with the maximum sequence length in the sequence group may be selected as a reference sub-group. For example, the maximum sequence length in the sequence group is 37, and a sub-group with the sequence length 37 is selected as a reference sub-group. In this case, $N_{p_1}=N_2=37$, and 36 sequence groups are available. When $r_2$ meets $-1/(2N_1)<r_2/N_2<1/(2N_1)$, if the value of $r_1$ is not limited to $r_1=1, 2, \ldots, N_1-1$, then $r_1$ that makes the $|r_2/N_2-r_1/N_1|$ value the smallest is 0. In practice, the value 0 of $r_1$ does not correspond to the Zadoff-Chu sequence. Therefore, $r_2$ that makes $-1/(2N_1)<r_2/N_2<1/(2N_1)$, namely, $r_2=+1,-1$, may be removed. In this way, there are 34 groups of sequences in total. In a sequence group, the quantity of the shortest sequences is less than 36. Therefore, the shortest sequences are used repeatedly.

Moreover, the reference sub-group may be a default sub-group of the system, and may be set by the system as required and notified to the user. After a sequence in the reference sub-group j is selected, the sequences in the sub-group i are n sequences that make the $d(f_i(\cdot), f_j(\cdot))$ value smaller, and are in the sequence group that contain the sequences selected for the reference sub-group j. Different sequence groups are generated by selecting different sequences of the reference sub-group j.

The sequence group formed in the above method is described below through examples.

There are 3 sub-groups in total in this embodiment. The sequence candidate collection includes Zadoff-Chu sequences whose lengths are 11, 23 and 37 respectively, corresponding to three resource occupation modes. If $N_{p_1}=N_1=11$ is selected, then there are 10 sequence groups in total. By selecting the sequences that make the absolute value of $(r_m/N_m-r_1/N_1)$ the smallest and including them into each sequence group, where each sub-group contains only one sequence and the sequence is represented by a basic sequence index, the following table is generated:

TABLE 1

| $N_1 = 11$ Group Number K | $N_2 = 23$ Basic Sequence Index $r_2$ | $N_3 = 37$ Basic Sequence Index $r_3$ |
|---|---|---|
| 1 | 2 | 3 |
| 2 | 4 | 7 |
| 3 | 6 | 10 |
| 4 | 8 | 13 |
| 5 | 10 | 17 |
| 6 | 13 | 20 |
| 7 | 15 | 24 |
| 8 | 17 | 27 |
| 9 | 19 | 30 |
| 10 | 21 | 34 |

The foregoing grouping method makes the absolute value of $r_m/N_m-r_1/N_1=(N_1r_m-N_mr_1)/(N_1N_m)$ the smallest, namely, makes the absolute value of $N_1r_m-N_mr_1$ the smallest. That is, the method ensures high correlation between sequences. As verified, the correlation between the sequences in each sequence group in Table 1 is very high.

In the foregoing embodiment, selection of the n sequences comes in two circumstances:

Preferably, n is 1, namely, in the foregoing example, a sequence that makes $(r_m/N_m - k/N_1)$ the smallest is selected and included into a sub-group m.

Preferably, n is a natural number greater than 1, and the value of n depends on the length difference between sub-group $N_m$ and reference sub-group $N_1$. The sequences corresponding to several basic sequence indexes near $r_m$ that makes $(r_m/N_m - k/N_1)$ the smallest are included into a sub-group. Generally, such sequences are n sequences closest to the minimum $r_m$, where n depends on the length difference between $N_1$ and $N_m$.

For example, if $N_m$ is about $4 \times N_1$, two $r_m$'s may be included into the group. Generally, $n = \lceil N_m/(2N_1) \rceil$ may be selected. In an example, $n = \lfloor N_m/N_1 \rfloor$ may be selected, where $\lfloor z \rfloor$ is the maximum integer not greater than z. In the sequence sub-group in this case, there may be more than one sequence of a certain length. After such allocation in the system, when using the sequence, the user may select any of the allocated n sequences for transmitting, for example, select the sequence that makes $(r_m/N_m - k/N_1)$ the smallest, second smallest, and so on.

When two Zadoff-Chu sequences of different lengths are highly correlated, it is sure that $|r_m/N_m - r_1/N_1|$ is relatively small. In the foregoing allocation method, it is ensured that the value of $|r_i/N_i - r_j/N_j|$ between two sub-groups i, j of different groups is great. Therefore, the sequences are little correlated between different groups, and the interference is low. Further, among the sequences of certain lengths, some may be selected for allocation, and the remaining are not used in the system. This prevents the sequences the second most correlated with the sequences in the reference sub-group from appearing in other sequence groups, and reduces strong interference.

If the foregoing function d(a,b) is defined as $|(a-b) \bmod m_{k,i}|$, where modu $m_{k,i}$ causes the value of the function d(a,b) after this operation to be included in $(-m_{k,i}/2, m_{k,i}/2]$, and $m_{k,i}$ is a variable determined by the group number k and sub-group number i, then $m_{k,i} = 1/B$, where B is a natural number, namely, $m_{k,i} \in \{1, 1/2, 1/3, 1/4, \ldots\}$.

The foregoing sequence allocation mode is described below, taking a Zadoff-Chu sequence, namely, $a_{r,N}(z)$, in the CAZAC sequence as an example:

For the sequence group $k = 1, 2, \ldots$, the sub-group numbered $p_1$ is selected as a reference sub-group. The foregoing $G_k$ is defined as $G_k = f_{p_1}(\{a_{w_k,N_{p_1}}(z)\}_{z=0,1,\ldots,N_1-1}) = w_k/N_{p1}$, $N_{p_1}$ is the length of the reference sub-group sequence, and $w_k$ is a basic sequence index of the sequence with a length of $N_{p_1}$ determined by the sequence group k. Particularly, if $w_k = k$ is selected, then $G_k = f_{p_1}(\{a_{k,N_{p_1}}\}) = k/N_{p_1}$. Therefore, the sequence that makes the $d(f_{p_1}(\cdot), G_k) = d(f_{p_1}(\cdot), f_{p_1}(a_{k,N_{p_1}}))$ value the smallest in the sub-group numbered $p_1$ in the sequence group k is the $\{a_{k,N_{p_1}}\}$ sequence with the index of $r_{p_1} = k$ and length of $N_{p_1}$. In this case, $d(f_{p_1}(\cdot), G_k) = 0$.

The sequences in the sub-group i=q in the sequence group k are n sequences that have the length of $N_q$ and make the $|(r_q/N_q - k/N_{p_1}) \bmod m_{k,q}|$ value the smallest, second smallest, and third smallest respectively, namely, n sequences that make the $d(f_{p_1}(\cdot), f_{p_1}(\{a_{k,N_{p_1}}\}))$ value the smallest.

It should be noted that the foregoing function $d(a,b) = |(a-b) \bmod m_{k,i}|$ may vary between different sequence groups, or different sub-groups of the same sequence group. For example, all sub-groups of one sequence group adopt a d(a,b) function, and all sub-groups of another sequence group adopt another d(a,b) function. Alternatively, one sub-group adopts a d(a,b) function, and another sub-group may adopt another d(a,b) function. Specifically, $m_{k,i}$ in the function has different values, which give rise to different measurement functions.

The sequence group formed in the foregoing method is described below through examples.

There are 3 sub-groups in total in this embodiment. The sequence candidate collection includes Zadoff-Chu sequences whose lengths are 31, 47 and 59 respectively, corresponding to three resource occupation modes. If $N_{p_1} = N_1 = 31$ is selected, then there are 30 sequence groups in total. By using $m_{k,q}$ in Table 2 and selecting the sequences that make $|(r_q/N_q - k/N_1) \bmod m_{k,q}|$ the smallest and including them into each sequence group, where each sub-group contains only one sequence and the sequence is represented by a basic sequence index, Table 3 is generated:

TABLE 2

| $N_1 = 31$ Group Number K | $N_2 = 47$ $m_{k,2}$ | $N_3 = 59$ $m_{k,3}$ |
|---|---|---|
| 1 | 1/2 | 1 |
| 2 | 1 | 1 |
| 3 | 1/2 | 1/3 |
| 4 | 1 | 1/2 |
| 5 | 1/2 | 1/2 |
| 6 | 1 | 1/2 |
| 7 | 1/2 | 1/3 |
| 8 | 1 | 1 |
| 9 | 1/3 | 1 |
| 10 | 1 | 1 |
| 11 | 1/3 | 1 |
| 12 | 1 | 1 |
| 13 | 1/3 | 1 |
| 14 | 1/4 | 1/2 |
| 15 | 1/3 | 1/2 |
| 16 | 1/3 | 1/2 |
| 17 | 1/4 | 1/2 |
| 18 | 1/3 | 1 |
| 19 | 1 | 1 |
| 20 | 1/3 | 1 |
| 21 | 1 | 1 |
| 22 | 1/3 | 1 |
| 23 | 1 | 1 |
| 24 | 1/2 | 1/3 |
| 25 | 1 | 1/2 |
| 26 | 1/2 | 1/2 |
| 27 | 1 | 1/2 |
| 28 | 1/2 | 1/3 |
| 29 | 1 | 1 |
| 30 | 1/2 | 1 |

TABLE 3

| $N_1 = 31$ Group Number K | $N_2 = 47$ Basic Sequence Index $r_2$ | $N_3 = 59$ Basic Sequence Index $r_3$ |
|---|---|---|
| 1 | 25 | 2 |
| 2 | 3 | 4 |
| 3 | 28 | 45 |
| 4 | 6 | 37 |
| 5 | 31 | 39 |
| 6 | 9 | 41 |
| 7 | 34 | 33 |
| 8 | 12 | 15 |
| 9 | 45 | 17 |
| 10 | 15 | 19 |
| 11 | 1 | 21 |
| 12 | 18 | 23 |
| 13 | 4 | 25 |
| 14 | 33 | 56 |
| 15 | 7 | 58 |
| 16 | 40 | 1 |
| 17 | 14 | 3 |

TABLE 3-continued

| N₁ = 31 Group Number K | N₂ = 47 Basic Sequence Index r₂ | N₃ = 59 Basic Sequence Index r₃ |
|---|---|---|
| 18 | 43 | 34 |
| 19 | 29 | 36 |
| 20 | 46 | 38 |
| 21 | 32 | 40 |
| 22 | 2 | 42 |
| 23 | 35 | 44 |
| 24 | 13 | 26 |
| 25 | 38 | 18 |
| 26 | 16 | 20 |
| 27 | 41 | 22 |
| 28 | 19 | 14 |
| 29 | 44 | 55 |
| 30 | 22 | 57 |

The following grouping method makes $|(r_q/N_q-k/N_1)$ modu $m_{k,q}|$ smallest. As verified, all the sequences in Table 3 are the sequences the most correlated with the sequences in the reference sub-group of the same sequence group. Therefore, the correlation of the sequences between different groups is further reduced, and the inter-group interference is weaker.

When the number of sub-carriers that bear the sequence in the cell is not a prime number, it is necessary to select the sequence whose length is equal to the prime number around the number of sub-carriers, and the desired sequence is obtained through sequence segmentation or cyclic extension of the sequence before being transmitted.

The following description takes cyclic extension as an example. In this embodiment, there are quantities of sub-carriers that bear the sequences: 36, 48, and 60. The sequences with a length of the maximum prime number less than the quantity of sub-carriers, namely, the Zadoff-Chu sequences corresponding to the lengths 31, 47 and 59, are selected, and the desired sequences are obtained through cyclic extension of such sequences. If $N_{p_1}=N_1=31$ is selected, then there are 30 sequence groups in total. By using $m_{k,q}$ in Table 4 and selecting the sequences that make $|(r_q/N_q-k/N_1)$ modu $m_{k,q}|$ the smallest and including them into each sequence group, where each sub-group contains only one sequence and the sequence is represented by a basic sequence index, Table 5 is generated:

TABLE 4

| N₂ = 47 m_{k,2} | N₁ = 31 Group Number K | N₂ = 47 m_{k,2} | N₃ = 59 m_{k,3} | N₁ = 31 Group Number K | N₃ = 59 m_{k,3} |
|---|---|---|---|---|---|
| 1 | ½ | 1 | 16 | ⅓ | ½ |
| 2 | 1 | 1 | 17 | 1 | ⅓ |
| 3 | ½ | ⅓ | 18 | ⅓ | ⅓ |
| 4 | 1 | ½ | 19 | 1 | 1 |
| 5 | ½ | ½ | 20 | ⅓ | 1 |
| 6 | 1 | ½ | 21 | 1 | 1 |
| 7 | ⅓ | ⅓ | 22 | ⅓ | 1 |
| 8 | 1 | 1 | 23 | 1 | 1 |
| 9 | ⅓ | 1 | 24 | ⅓ | ⅓ |
| 10 | 1 | 1 | 25 | 1 | ½ |
| 11 | ⅓ | 1 | 26 | ½ | ½ |
| 12 | 1 | 1 | 27 | 1 | ½ |
| 13 | ⅓ | ⅓ | 28 | ½ | ⅓ |
| 14 | 1 | ⅓ | 29 | 1 | 1 |
| 15 | ⅓ | ½ | 30 | ½ | 1 |

TABLE 5

| N₁ = 31 Group Number K | N₂ = 47 Basic Sequence Index r₂ | N₃ = 59 Basic Sequence Index r₃ |
|---|---|---|
| 1 | 25 | 2 |
| 2 | 3 | 4 |
| 3 | 28 | 45 |
| 4 | 6 | 37 |
| 5 | 31 | 39 |
| 6 | 9 | 41 |
| 7 | 42 | 33 |
| 8 | 12 | 15 |
| 9 | 45 | 17 |
| 10 | 15 | 19 |
| 11 | 1 | 21 |
| 12 | 18 | 23 |
| 13 | 4 | 5 |
| 14 | 21 | 7 |
| 15 | 7 | 58 |
| 16 | 40 | 1 |
| 17 | 26 | 52 |
| 18 | 43 | 54 |
| 19 | 29 | 36 |
| 20 | 46 | 38 |
| 21 | 32 | 40 |
| 22 | 2 | 42 |
| 23 | 35 | 44 |
| 24 | 5 | 26 |
| 25 | 38 | 18 |
| 26 | 16 | 20 |
| 27 | 41 | 22 |
| 28 | 19 | 14 |
| 29 | 44 | 55 |
| 30 | 22 | 57 |

The following grouping method makes $|(r_q/N_q-k/N_1)$ modu $m_{k,q}|$ the smallest. As verified, all the sequences in Table 5 are the sequences the most correlated with the sequences in the reference length of the same sequence group. Therefore, the correlation of sequences between different groups is further reduced, and the inter-group interference is weaker.

The specific value of $m_{k,q}$ may be: if $N_q \geq L_r$, then $m_{k,q}=1$, where $N_q$ is the sequence length of the sub-group q, and $L_r$ is determined by the reference sub-group sequence length $N_{p_1}$. Specifically, for $N_{p_1}=N_1=-31$, $L_r=139$. If $N_q=139$ or above, then $m_{k,q}=1$. After cyclic extension of the sequence, $L_r=191$. Therefore, when $N_q=191$ or above, $m_{k,q}=1$.

In the foregoing embodiment, selection of the n sequences comes in two circumstances:

Preferably, n is 1, namely, in the foregoing example, a sequence that makes $|(r_q/N_q-k/N_1)$ modu $m_{k,q}|$ the smallest is selected and included into the sub-group q.

Preferably, n is a natural number greater than 1, and the value of n depends on the length difference between sub-group $N_q$ and reference sub-group $N_1$. The sequences corresponding to several basic sequence indexes near $r_q$ that makes $|(r_q/N_q-k/N_1)$ modu $m_{k,q}|$ the smallest are included into a sub-group. Generally, such sequences are n sequences closest to the minimum $r_q$, where n depends on the length difference between $N_1$, $N_q$. For example, if $N_q$ is about $4 \times N_1$, two $r_q$'s may be included into the group. Generally, $n=\lceil N_q/(2N_1)\rceil$ may be selected, where $\lceil z \rceil$ is the minimum integer greater than z. In another example, $n=\lfloor N_q/N_1 \rfloor$ may be selected, where $\lfloor z \rfloor$ is the maximum integer not greater than z. In the sequence sub-group in this case, there may be more than one sequence of a certain length. After such allocation in the system, when using the sequence, the user may select any of the allocated n sequences for transmitting, for example, select $r_q=f$ that makes $|(r_q/N_q-k/N_1)$ modu $m_{k,q}|$ the smallest, then the fewer n sequences are f±1, f±2, . . . . The transmitter and the receiver may obtain the data through calculation in this way rather than store the data.

When two Zadoff-Chu sequences of different lengths are highly correlated, it is sure that $|(r_q/N_q-r_1/N_1)$ modu $m_{r_1,q}|$ is relatively small. In the foregoing allocation method, it is ensured that the value of i,j between two sub-groups $|(r_i/N_i-r_j/N_j)$ modu $m_{r_j,i}|$ of different groups is great. Therefore, the sequences are little correlated between different groups, and the interference is low. Further, among the sequences of certain lengths, some may be selected for allocation, and the remaining are not used in the system. This prevents the sequences the second most correlated with the sequences in the reference sub-group from appearing in other sequence groups, and reduces strong interference between groups.

In other embodiments, the definition of the foregoing function d(a,b) may also be $d(a, b) = \begin{cases} |a - b|, & \text{when } u \le (a - b) \le v \\ \text{infinity, others} \end{cases}$, or $d(a, b) = \begin{cases} |(a - b) \text{ modu } m_{k,i}|, & \text{when } u \le (a - b) \text{ modu } m_{k,i} \le v \\ \text{infinity, others} \end{cases}$.

The infinity in the definition of the d(a,b) function filters out certain sequences, and ensures low correlation between different groups.

It should be noted that the foregoing function $d(a, b) = \begin{cases} |a - b|, & \text{when } u \le (a - b) \le v \\ \text{infinity, others} \end{cases}$ $d(a, b) = \begin{cases} |(a - b) \text{ modu } m_{k,i}|, & \text{when } u \le (a - b) \text{ modu } m_{k,i} \le v \\ \text{infinity, others} \end{cases}$ or may vary between different sequence groups, or different sub-groups of the same sequence group. For example, all sub-groups of one sequence group adopt a d(a,b) function, and all sub-groups of another sequence group adopt another d(a,b) function. Alternatively, one sub-group adopts a d(a,b) function, and another sub-group may adopt another d(a,b) function.

Specifically, u,v in the function has different values, which give rise to different measurement functions. For example, u=0, v=+∞, or u=−∞, v=0, or u=−1/(2×11)+1/(23×4), v=1/(2×11)−1/(23×4) or u=a, v=b, where a,b depend on the sequence group k and sub-group i, and so on.

Specifically, in the foregoing embodiment of $f_i$: $\{a_{r_i,N_i}(z)\}_{z=0,1,2,\ldots,N_i-1} \to r_i/N_i$, if $d(a, b) = \begin{cases} |a - b|, & \text{when } u \le (a - b) \le v \\ \text{infinity, others} \end{cases}$, this embodiment is: selecting the sequences that meet $u \le (r_i/N_i-k/N_{p_1}) \le v$ and including them into each sequence group; $|r_i/N_i-r_j/N_j|>1/C_i$ is met between any two sequences of different sequence groups, where $N_i<N_j$, as detailed below:

First, u=0, v=+∞ or, u=−∞, v=0, namely, the sequences that make the value the smallest in a single direction. For the positive direction, it is equivalent to selecting the sequences that meet $(r_m/N_m-k/N_{p_1}) \ge 0$; for the negative direction, it is equivalent to selecting the sequences that meet $(k/N_{p_1}-r_m/N_m) \ge 0$. For example, if the sub-group length is $N_m$, the positive result closest to $k/N_{p_1}$ is $r_m$ with the difference of 0.036, and the negative result closest to $k/N_{p_1}$ is $r'_m$ with the difference of −0.025. The one most correlated with the $r_{p_1}$=k sequence of a length of $N_{p_1}$ is $r'_m$. If the system specifies that the sequence in the positive direction of $(r_m/N_m-k/N_{p_1})$ needs to be selected, $r_m$ is selected. The benefit is: after the sequences of various lengths are compared with $k/N_{p_1}$, the difference between the function values, namely, $|r_i/N_i-r_j/N_j|$, is smaller.

Secondly, $u=-1/(2N_{p_1})+1/(4N_{p_2})$ and $v=1/(2N_{p_1})-1/(4N_{p_2})$ may be selected. The length ($N_{p_1}$) of the reference sequence is the shortest sequence length and $N_{p_2}$ is the sequence length only greater than $N_{p_1}$. Here is an example:

In this embodiment, there are 4 sub-groups in total. The candidate sequence collections contain Zadoff-Chu sequences with $N_1$=11, $N_2$=23, $N_3$=37, and $N_4$=47 respectively. By selecting the sequences that meet $|r_i/N_i-k/N_1|<1/(2N_1)-1/(4N_2)$, namely, $|r_i/N_i-k/N_1|<1/(2\times11)-1/(4\times23)$ and including them into the sub-groups of each sequence group, the following table is generated, where the sequence is represented by a basic sequence index:

TABLE 6

| $N_1$ = 11 Group Number K | $N_2$ = 23 Basic Sequence Index $r_2$ | $N_3$ = 37 Basic Sequence Index $r_3$ | $N_4$ = 47 Basic Sequence Index $r_4$ |
|---|---|---|---|
| 1 | 2 | 3, 4 | 3, 4, 5 |
| 2 | 4 | 6, 7, 8 | 7, 8, 9, 10 |
| 3 | 6, 7 | 9, 10, 11 | 12, 13, 14 |
| 4 | 8, 9 | 13, 14 | 16, 17, 18 |
| 5 | 10, 11 | 16, 17, 18 | 20, 21, 22 |
| 6 | 12, 13 | 19, 20, 21 | 25, 26, 27 |
| 7 | 14, 15 | 23, 24 | 29, 30, 31 |
| 8 | 16, 17 | 26, 27, 28 | 33, 34, 35 |
| 9 | 19 | 29, 30, 31 | 37, 38, 39, 40 |
| 10 | 21 | 33, 34 | 42, 43, 44 |

In table 6, $|r_i/N_i-r_j/N_j|>1/(2N_i)$ is met between any two sequences of different sequence groups, where $N_i<N_j$. In this way, the correlation between the two sequences is relatively lower.

Thirdly, for different sequence groups k and different sub-groups i in the same sequence group, u, v may differ.

The shortest sequence is selected as a reference sequence. Therefore, $N_{p_1}$ represents the length of the shortest sequence, and $N_{p_L}$ represents the length of the longest sequence; the sequence group that includes the basic sequence with a length of $N_{p_1}$ and an index of 1 is numbered "$q_1$"; the sequence group that includes the basic sequence with a length of $N_{p_1}$ and an index of $N_{p_1}-1$ is numbered "$q_{N_{p_1}-1}$"; the sequence group that includes the basic sequence with a length of $N_{p_1}$ and an index of k is numbered "$q_k$"; the sequence group that includes the basic sequence with a length of $N_{p_1}$ and an index of k+1 is numbered "$q_{k+1}$"; the sub-group that includes the basic sequence with a length of $N_{p_1}$ is numbered "$p_1$"; the sub-group that includes the basic sequence with a length of $N_{p_m}$ is numbered "$p_m$"; the sub-group that includes the basic sequence with a length of $N_{p_{i-1}}$ is numbered "$p_{i-1}$"; and the sub-group that includes the basic sequence with a length of $N_{p_i}$ is numbered "$p_i$", where $N_{p_{i-1}}<N_{p_i}$.

Step 1001: For the sub-group $p_1$ of the sequence group $q_1$, $u_{q_1,p_1} = -1/(2N_{p_1}) + \delta_u$, where $1/N_{pL} - 1/N_{p_1} + 1/(2N_{p_1}) \leq \delta_u < \frac{1}{2}(N_{p_1})$.

$v_{q_k,p_1}$ of the sub-group $p_1$ of the sequence group $q_k$ and $u_{q_{k+1},p_1}$ of the sub-group $p_1$ of the sequence group $q_{k+1}$ ($k=1, \ldots, N_{p_1}-2$) are:

$$v_{q_k,p_1} = 1/D, u_{q_{k+1},p_1} = -1/D, \text{ where } 1/D \leq 1/(2N_{p_1}).$$

Figure 3:
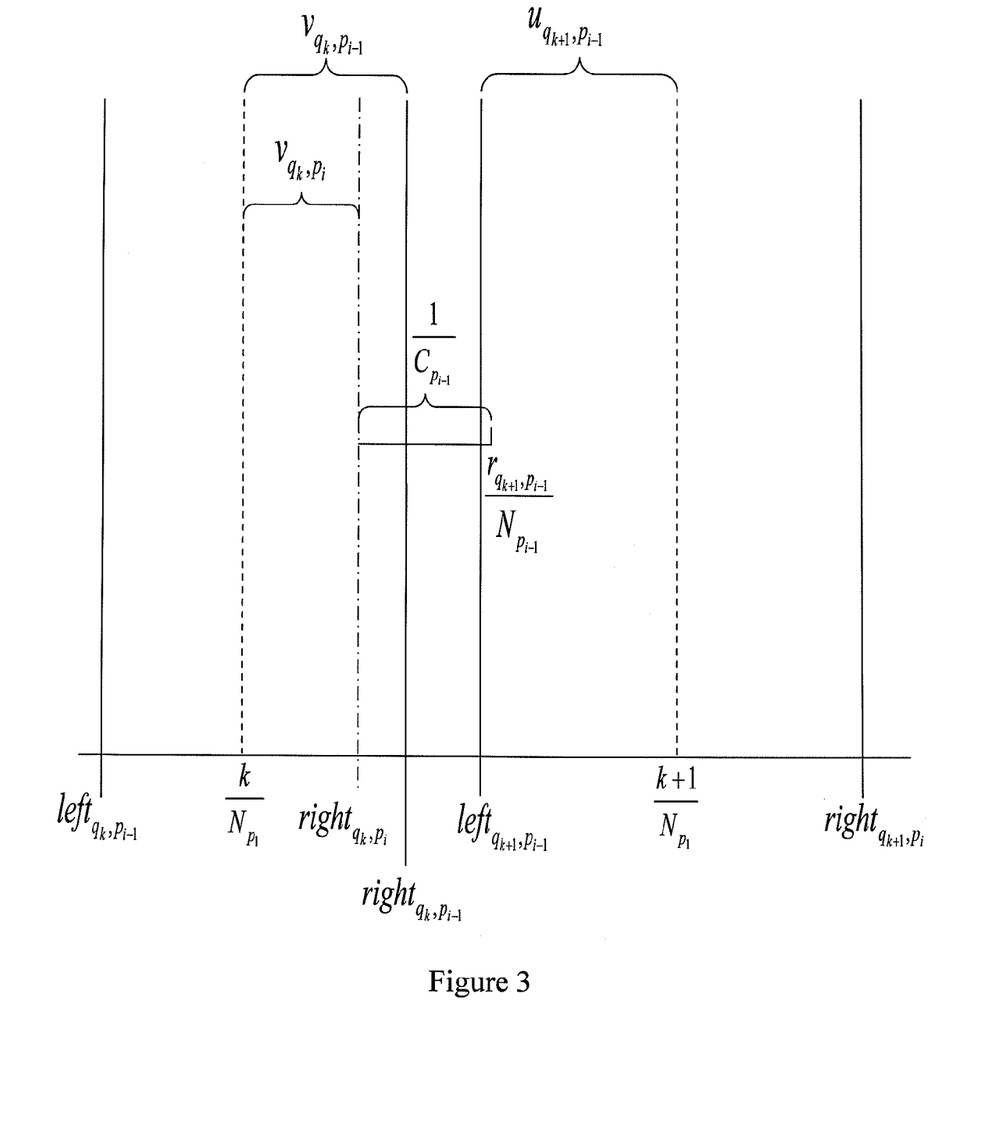
FIG. 3 shows a calculation process for determining u and v in an embodiment of the present application.

Step 1002: As shown in FIG. 3, $v_{q_k,p_i}$ of the sub-group $p_i$ of the sequence group $q_k$ and $u_{q_{k+1},p_i}$ of the sub-group $p_i$ of the sequence group $q_{k+1}$ ($k=1, \ldots, N_{p_1}-2$, $i \in S$) are:

$$\text{right}_{q_k,p_{i-1}} = v_{q_k,p_{i-1}} + k/N_{p_1}, \text{left}_{q_{k+1},p_{i-1}} = u_{q_{k+1},p_{i-1}} + (k+1)/N_{p_1}$$

For the basic sequence with a length of $N_{p_{i-1}}$, depending on the value of $r_{p_{i-1}}$, $r_{q_{k+1},p_{i-1}}$ that meets $r_{p_{i-1}}/N_{p_{i-1}} - \text{left}_{q_{k+1},p_{i-1}} \geq 0$ and minimum $|r_{p_{i-1}}/N_{p_{i-1}} - \text{left}_{q_{k+1},p_{i-1}}|$ is obtained, namely, the obtained basic sequence $r_{q_{k+1},p_{i-1}}$ is included in the sequence group $q_{k+1}$, has a length of $N_{p_{i-1}}$ and is closest to the left border ($\text{left}_{q_{k+1},p_{i-1}}$) of the sequence group $q_{k+1}$.

If $r_{q_{k+1},p_{i-1}}/N_{p_{i-1}} - 1/C_{p_{i-1}} - \text{right}_{q_k,p_{i-1}} \geq 0$, namely, $r_{q_{k+1},p_{i-1}}/N_{p_{i-1}} - 1/C_{p_{i-1}}$ is less than the right border ($\text{right}_{q_k,p_{i-1}}$) of the sequence group $q_k$, then $v_{q_k,p_i} = v_{q_k,p_{i-1}} + r_{q_{k+1},p_{i-1}}/N_{p_{i-1}} - 1/C_{p_{i-1}} - \text{right}_{q_k,p_{i-1}}$, to ensure low cross correlation between the sequence group $q_k$ and its adjacent sequence group $q_{k+1}$; if $r_{q_{k+1},p_{i-1}}/N_{p_{i-1}} - 1/C_{p_{i-1}} - \text{right}_{q_k,p_{i-1}} > 0$, namely, $r_{q_{k+1},p_{i-1}}/N_{p_{i-1}} - 1/C_{p_{i-1}}$ is greater than the right border ($\text{right}_{q_k,p_{i-1}}$) of the sequence group $q_k$, then $v_{q_k,p_i} = v_{q_k,p_{i-1}}$.

For the basic sequence with a length of $N_{p_{i-1}}$, depending on the value of $r_{p_{i-1}}$, $r_{q_k,p_{i-1}}$ that meets $r_{p_{i-1}}/N_{p_{i-1}} - \text{right}_{q_k,p_{i-1}} \geq 0$ and minimum $|r_{p_{i-1}}/N_{p_{i-1}} - \text{right}_{q_k,p_{i-1}}|$ is obtained, namely, the obtained basic sequence $q_k$ is included in the sequence group $N_{p_{i-1}}$, has a length of $q_k$ and is closest to the right border ($\text{right}_{q_k,p_{i-1}}$) of the sequence group $r_{q_k,p_{i-1}}$.

If $r_{q_k,p_{i-1}}/N_{p_{i-1}} + 1/C_{p_{i-1}} - \text{left}_{q_{k+1},p_{i-1}} \geq 0$ namely, $r_{q_k,p_{i-1}}/N_{p_{i-1}} + 1/C_{p_{i-1}}$ is greater than the left border ($q_{k+1}$) of the sequence group $\text{left}_{q_{k+1},p_{i-1}}$, then $u_{q_{k+1},p_i} = u_{q_{k+1},p_{i-1}} + r_{q_k,p_{i-1}}/N_{p_{i-1}} + 1/C_{p_{i-1}} - \text{left}_{q_{k+1},p_{i-1}}$, to ensure low cross correlation between the sequence group $q_k$ and its adjacent sequence group $q_{k+1}$; if $r_{q_k,p_{i-1}}/N_{p_{i-1}} + 1/C_{p_{i-1}} - \text{left}_{q_{k+1},p_{i-1}} < 0$, namely, $r_{q_k,p_{i-1}}/N_{p_{i-1}} + 1/C_{p_{i-1}}$ is less than the left border ($q_{k+1}$) of the sequence group $\text{left}_{q_{k+1},p_{i-1}}$, then $u_{q_{k+1},p_i} = u_{q_{k+1},p_{i-1}}$.

$q_{N_{p1}-1}$ of the sub-group $p_i$ of the sequence group $v_{q_{N_{p1}-1},p_i}$ and $q_1$ of the sub-group $p_i$ of the sequence group $u_{q_1,p_i}$ ($i \in S$) are:

$$\text{right}_{q_{N_{p1}-1},p_{i-1}} = v_{q_{N_{p1}-1},p_{i-1}} + (N_{p_1}-1)/N_{p_1},$$
$$\text{left}_{q_1,p_{i-1}} = u_{q_1,p_{i-1}} + 1/N_{p_1}$$

$$\text{right}_{q_{N_{p1}-1},p_{i-1}}' = v_{q_{N_{p1}-1},p_{i-1}} - 1/N_{p_1}, \text{left}_{q_1,p_{i-1}}' = u_{q_1,p_{i-1}} + (N_{p_1}+1)/N_{p_1}$$

For the basic sequence with a length of $N_{p_{i-1}}$, depending on the value of $r_{p_{i-1}}$, $r_{q_1,p_{i-1}}$ that meets $r_{p_{i-1}}/N_{p_{i-1}} - \text{left}_{q_1,p_{i-1}} \geq 0$ and minimum $|r_{p_{i-1}}/N_{p_{i-1}} - \text{left}_{q_1,p_{i-1}}|$ is obtained;

If $r_{q_1,p_{i-1}}/N_{p_{i-1}} - 1/C_{p_{i-1}} - \text{right}_{q_{N_{p1}-1},p_{i-1}}' \leq 0$, then $v_{q_{N_{p1}-1},p_{i-1}} = v_{q_{N_{p1}-1},p_{i-1}} + r_{q_1,p_{i-1}}/N_{p_{i-1}} - 1/C_{p_{i-1}} - \text{right}_{q_{N_{p1}-1},p_{i-1}}'$; if $r_{q_1,p_{i-1}}/N_{p_{i-1}} - 1/C_{p_{i-1}} - \text{right}_{q_{N_{p1}-1},p_{i-1}}' > 0$, then $v_{q_{N_{p1}-1},p_i} = v_{q_{N_{p1}-1},p_{i-1}}$;

For the basic sequence with a length of $N_{p_{i-1}}$, depending on the value of $r_{p_{i-1}}$, $r_{q_{N_{p1}-1},p_{i-1}}$ that meets $r_{p_{i-1}}/N_{p_{i-1}} - \text{right}_{q_{N_{p1}-1},p_{i-1}} \leq 0$ and minimum $|r_{p_{i-1}}/N_{p_{i-1}} - \text{right}_{q_{N_{p1}-1},p_{i-1}}|$ is obtained;

If $r_{q_{N_{p1}-1},p_{i-1}}/N_{p_{i-1}} + 1/C_{p_{i-1}} - \text{left}_{q_1,p_{i-1}}' \geq 0$, then $u_{q_1,p_i} = u_{q_1,p_{i-1}} + r_{q_{N_{p1}-1},p_{i-1}}/N_{p_{i-1}} + 1/C_{p_{i-1}} - \text{left}_{q_1,p_{i-1}}'$; if $r_{q_{N_{p1}-1},p_{i-1}}/N_{p_{i-1}} + 1/C_{p_{i-1}} - \text{left}_{q_1,p_{i-1}}' < 0$, then $u_{q_1,p_i} = u_{q_1,p_{i-1}}$;

Particularly, $C_{p_{i-1}} = 2N_{p_{i-1}}$.

Step 1003: $u_{q_k,p_i}$ and $v_{q_k,p_i}$ of the sub-group $p_i$ in the sequence group $q_k$ ($k=1, \ldots, N_{p_1}-1$, $i \in I-S$) are:

$u_{q_k,p_i} = u_{q_k,p_m}$ and $v_{q_k,p_i} = v_{q_k,p_m}$, respectively where I and S are two index collections; in the collection $I=\{2, 3, \ldots, L\}$, L is the quantity of sequence lengths in a candidate sequence collection, and the collection S is the collection I or a sub-collection of the collection I, and m is an element with the maximum value in the collection S.

In the following example, $\delta_u=0$, $\delta_v=0$, $D=2N_{p_1}$, $C_{p_{i-1}} = 2N_{p_{i-1}}$, $q_k=k$ and $p_i=i$.

Example 1

In this example, there are 4 sub-groups in total. The candidate sequence collection contains the Zadoff-Chu are sequences with $N_{11}=11$, $N_2=23$, $N_3=37$, and $N_4=47$ respectively. Taking the fourth sequence group as an example (namely, k=4), $v_{4,i}$ and $u_{5,i}$ $i \in \{1,2,3,4\}$ are obtained through step 1101, specifically:

For the sub-group 1, $v_{4,1}=1/(2\times11)$, $u_{5,1}=-1/(2\times11)$.

For the sub-group 2, $\text{right}_{4,1}=v_{4,1}+4/11=1/(2\times11)+4/11$, $\text{left}_{5,1}=u_{5,1}+5/11=-1/(2\times11)+5/11$; because no $r_{5,1}$ or $r_{4,1}$ compliant with the conditions exists, $v_{4,2}=v_{4,1}$, namely, $v_{4,2}=1/(2\times11)$; $u_{5,2}=u_{5,1}$, namely, $u_{5,2}=-1/(2\times11)$.

For the sub-group 3, $\text{right}_{4,2}=v_{4,2}+4/11=1/(2\times11)+4/11$, $\text{left}_{5,2}=u_{5,2}+5/11=-1/(2\times11)+5/11$.

For $N_2=23$, when $r_2$ varies, if $r_{5,2}=10$, then $r_{5,2}/N_2-\text{left}_{5,2}>0$ and $|r_{5,2}/N_2-\text{left}_{5,2}|$ is the minimum value; because $r_{5,2}/N_2-\frac{1}{2}(N_2)-\text{right}_{4,2}>0$, $v_{4,3}=v_{4,2}$, namely, $v_{4,3}=1(2\times11)$.

For $N_2=23$, when $r_2$ varies, if $r_{4,2}=9$ then $r_{4,2}/N_2-\text{right}_{4,2}<0$ and $|r_{4,2}/N_2-\text{right}_{4,2}|$ is the minimum value; because $r_{4,2}/N_2+1/(2N_2)-\text{left}_{5,2}>0$, $$u_{5,3} = u_{5,2} + r_{4,2}/N_2 + 1/(2N_2) - \text{left}_{5,2}$$
$$= -1/(2\times11) + 9/23 + 1/(2\times23) - (-1/(2\times11) + 5/11)$$
$$= -21/(2\times11\times23).$$

For the sub-group 4, $\text{right}_{4,3}=v_{4,3}+4/11=1/(2\times11)+4/11$, $\text{left}_{5,3}=u_{5,3}+5/11=-21/(2\times11\times23)+5/11$.

For $N_3=37$, when $r_3$ varies, if $r_{5,3}=16$, then $r_{5,3}/N_3-\text{left}_{5,3}>0$ and $|r_{5,3}/N_3-\text{left}_{5,3}|$ is the minimum value; because $r_{5,3}/N_3-1/(2N_3)-\text{right}_{4,3}>0$, $v_{4,4}=v_{4,3}$, namely, $v_{4,4}=1/(2\times11)$.

For $N_3=37$, when $r_3$ varies, if $r_{4,3}=15$, then $r_{4,3}/N_3-\text{right}_{4,3}<0$ and $|r_{4,3}/N_3-\text{right}_{4,3}|$ is the minimum value; because $r_{4,3}/N_3+1/(2N_3)-\text{left}_{5,3}>0$, $$u_{5,4} = u_{5,3} + r_{4,3}/N_3 + 1/(2N_3) - \text{left}_{5,3}$$
$$= -21/(2\times11\times23) + 15/37 + 1/(2\times37) -$$
$$(-21/(2\times11\times23) + 5/11)$$
$$= -29/(2\times11\times37).$$

By analogy, u and v of all sub-groups of all sequence groups are obtained, and the following table is generated:

TABLE 7

| Sub-Group i<br>Group Number k | 1 | 2 | 3 | 4 |
|---|---|---|---|---|
| 1 | $u_{1,1} = -1/(2 \times 11)$<br>$v_{1,1} = 1/(2 \times 11)$ | $u_{1,2} = -1/(2 \times 11)$<br>$v_{1,2} = 1/(2 \times 11)$ | $u_{1,3} = -1/(2 \times 11)$<br>$v_{1,3} = 1/(2 \times 11)$ | $u_{1,4} = -1/(2 \times 11)$<br>$v_{1,4} = 1/(2 \times 11)$ |
| 2 | $u_{2,1} = -1/(2 \times 11)$<br>$v_{2,1} = 1/(2 \times 11)$ | $u_{2,2} = -1/(2 \times 11)$<br>$v_{2,2} = 1/(2 \times 11)$ | $u_{2,3} = -15/(2 \times 11 \times 23)$<br>$v_{2,3} = 1/(2 \times 11)$ | $u_{2,4} = -15/(2 \times 11 \times 23)$<br>$v_{2,4} = 1/(2 \times 11)$ |
| 3 | $u_{3,1} = -1/(2 \times 11)$<br>$v_{3,1} = 1/(2 \times 11)$ | $u_{3,2} = -1/(2 \times 11)$<br>$v_{3,2} = 1/(2 \times 11)$ | $u_{3,3} = -17/(2 \times 11 \times 23)$<br>$v_{3,3} = 1/(2 \times 11)$ | $u_{3,4} = -17/(2 \times 11 \times 23)$<br>$v_{3,4} = 1/(2 \times 11)$ |
| 4 | $u_{4,1} = -1/(2 \times 11)$<br>$v_{4,1} = 1/(2 \times 11)$ | $u_{4,2} = -1/(2 \times 11)$<br>$v_{4,2} = 1/(2 \times 11)$ | $u_{4,3} = -19/(2 \times 11 \times 23)$<br>$v_{4,3} = 1/(2 \times 11)$ | $u_{4,4} = -19/(2 \times 11 \times 23)$<br>$v_{4,4} = 1/(2 \times 11)$ |
| 5 | $u_{5,1} = -1/(2 \times 11)$<br>$v_{5,1} = 1/(2 \times 11)$ | $u_{5,2} = -1/(2 \times 11)$<br>$v_{5,2} = 1/(2 \times 11)$ | $u_{5,3} = -21/(2 \times 11 \times 23)$<br>$v_{5,3} = 1/(2 \times 11)$ | $u_{5,4} = -29/(2 \times 11 \times 37)$<br>$v_{5,4} = 1/(2 \times 11)$ |
| 6 | $u_{6,1} = -1/(2 \times 11)$<br>$v_{6,1} = 1/(2 \times 11)$ | $u_{6,2} = -1/(2 \times 11)$<br>$v_{6,2} = 1/(2 \times 11)$ | $u_{6,3} = -1/(2 \times 11)$<br>$v_{6,3} = 21/(2 \times 11 \times 23)$ | $u_{6,4} = -1/(2 \times 11)$<br>$v_{6,4} = 29/(2 \times 11 \times 37)$ |
| 7 | $u_{7,1} = -1/(2 \times 11)$<br>$v_{7,1} = 1/(2 \times 11)$ | $u_{7,2} = -1/(2 \times 11)$<br>$v_{7,2} = 1/(2 \times 11)$ | $u_{7,3} = -1/(2 \times 11)$<br>$v_{7,3} = 19/(2 \times 11 \times 23)$ | $u_{7,4} = -1/(2 \times 11)$<br>$v_{7,4} = 19/(2 \times 11 \times 23)$ |
| 8 | $u_{8,1} = -1/(2 \times 11)$<br>$v_{8,1} = 1/(2 \times 11)$ | $u_{8,2} = -1/(2 \times 11)$<br>$v_{8,2} = 1/(2 \times 11)$ | $u_{8,3} = -1/(2 \times 11)$<br>$v_{8,3} = 17/(2 \times 11 \times 23)$ | $u_{8,4} = -1/(2 \times 11)$<br>$v_{8,4} = 17/(2 \times 11 \times 23)$ |
| 9 | $u_{9,1} = -1/(2 \times 11)$<br>$v_{9,1} = 1/(2 \times 11)$ | $u_{9,2} = -1/(2 \times 11)$<br>$v_{9,2} = 1/(2 \times 11)$ | $u_{9,3} = -1/(2 \times 11)$<br>$v_{9,3} = 15/(2 \times 11 \times 23)$ | $u_{9,4} = -1/(2 \times 11)$<br>$v_{9,4} = 15/(2 \times 11 \times 23)$ |
| 10 | $u_{10,1} = -1/(2 \times 11)$<br>$v_{10,1} = 1/(2 \times 11)$ | $u_{10,2} = -1/(2 \times 11)$<br>$v_{10,2} = 1/(2 \times 11)$ | $u_{10,3} = -1/(2 \times 11)$<br>$v_{10,3} = 1/(2 \times 11)$ | $u_{10,4} = -1/(2 \times 11)$<br>$v_{10,4} = 1/(2 \times 11)$ |

Step 1102: The sequences that meet $u_{k,i} \leq (r_i/N_i - k/N_1) \leq v_{k,i}$ are selected and included into the sub-group i of the sequence group k, where the sequence is represented by a basic sequence index. Thus the following table is generated:

TABLE 8

| $N_1 = 11$<br>Group Number K | $N_2 = 23$<br>Basic Sequence Index<br>$r_2$ | $N_3 = 37$<br>Basic Sequence Index<br>$r_3$ | $N_4 = 47$<br>Basic Sequence Index<br>$r_4$ |
|---|---|---|---|
| 1 | 2, 3 | 2, 3, 4, 5 | 3, 4, 5, 6 |
| 2 | 4, 5 | 6, 7, 8 | 8, 9, 10 |
| 3 | 6, 7 | 9, 10, 11 | 12, 13, 14 |
| 4 | 8, 9 | 13, 14, 15 | 16, 17, 18, 19 |
| 5 | 10, 11 | 16, 17, 18 | 20, 21, 22, 23 |
| 6 | 12, 13 | 19, 20, 21 | 24, 25, 26, 27 |
| 7 | 14, 15 | 22, 23, 24 | 28, 29, 30, 31 |
| 8 | 16, 17 | 26, 27, 28 | 33, 34, 35 |
| 9 | 18, 19 | 29, 30, 31 | 37, 38, 39 |
| 10 | 20, 21 | 32, 33, 34, 35 | 41, 42, 43, 44 |

Example 2

If the sequence group contains more sub-groups, after u and v are calculated to a certain sub-group, u and v of the sub-groups of longer sequences do not change any more. For example, if the system bandwidth is 5 Mbps, the sequence lengths include: $N_1=11$, $N_2=23$, $N_3=37$, $N_4=47$, $N_5=59$, $N_6=71$, $N_7=97$, $N_8=107$, $N_9=113$, $N_{10}=139$, $N_{11}=179$, $N_{12}=191$, $N_{13}=211$, $N_{14}=239$, $N_{15}=283$, and $N_{16}=293$. Taking the fourth sequence group as an example, namely, $k=4$, $v_{4,i}$ and $u_{5,i}$ $i \in \{1, 2, 3, \ldots, 16\}$ are obtained in the following way:

For the sub-group 1, $v_{4,1}=1/(2\times11)$, and $u_{5,1}=-1/(2\times11)$.

For the sub-group 2, $right_{4,1}=v_{4,1}+4/11=1/(2\times11)+4/11$, $left_{5,1}=u_{5,1}+5/11=-1/(2\times11)+5/11$; because no $r_{5,1}$ or $r_{4,1}$ compliant with the conditions exists, $v_{4,2}=v_{4,1}$, namely, $v_{4,2}=1/(2\times11)$; $u_{5,2}=u_{5,1}$, namely, $u_{5,2}=-1/(2\times11)$.

For the sub-group 3, $right_{4,2}=v_{4,2}+4/11=1/(2\times11)+4/11$, and $left_{5,2}=u_{5,2}+5/11=-1/(2\times11)+5/11$.

For $N_2=23$, when $r_2$ varies, if $r_{5,2}=10$, then $r_{5,2}/N_2-left_{5,2}<0$ and $|r_{5,2}/N_2-left_{5,2}|$ is the minimum value; because $r_{5,2}/N_2-1/2(N_2)-right_{4,2}>0$, $v_{4,3}=v_{4,2}$, namely, $v_{4,3}=1/(2\times11)$.

For $N_2=23$, when $r_2$ varies, if $r_{4,2}=9$, then $r_{4,2}/N_2-right_{4,2}<0$ and $|r_{4,2}/N_2-right_{4,2}|$ is the minimum value; because $r_{4,2}/N_2+1(2N_2)-left_{5,2}>0$, $$u_{5,3} = u_{5,2} + r_{4,2}/N_2 + 1/(2N_2) - left_{5,2}$$
$$= -1/(2\times11) + 9/23 + 1/(2\times23) - (-1/(2\times11) + 5/11)$$
$$= -21/(2\times11\times23).$$

For the sub-group 4, $right_{4,3}=v_{4,3}+4/11=1/(2\times11)+4/11$, and $left_{5,3}=u_{5,3}+5/11=-21/(2\times11\times23)+5/11$.

For $N_3=37$, when $r_3$ varies, if $r_{5,3}=16$, then $r_{5,3}/N_3-left_{5,3}>0$ and $|r_{5,3}/N_3-left_{5,3}|$ is the minimum value; because $r_{5,3}/N_3-1/(2N_3)-right_{4,3}>0$, $v_{4,4}=v_{4,3}$, namely, $v_{4,4}=1/(2\times11)$.

For $N_3=37$, when $r_3$ varies, if $r_{4,3}=15$, then $r_{4,3}/N_3-right_{4,3}<0$ and $|r_{4,3}/N_3-right_{4,3}|$ is the minimum value; because $r_{4,3}/N_3+1/(2N_3)-left_{5,3}>0$, $$u_{5,4} = u_{5,3} + r_{4,3}/N_3 + 1/(2N_3) - left_{5,3}$$
$$= -21/(2\times11\times23) + 15/37 + 1/(2\times37) -$$
$$(-21/(2\times11\times23) + 5/11)$$
$$= -29/(2\times11\times37)$$

For the sub-group 5, $v_{4,5}=v_{4,4}$, namely, $v_{4,5}=1/(2\times11)$; $u_{5,5}=u_{5,4}$, namely, $u_{5,5}=-29/(2\times11\times37)$.

For the sub-group 6, $v_{4,6}=v_{4,5}$, namely, $v_{4,6}=1/(2\times11)$; $u_{5,6}=u_{5,5}$, namely, $u_{5,6}=-29/(2\times11\times37)$.

For the sub-group 7, $_6v_{4,7}=v_4$, namely, $v_{4,7}=1/(2\times11)$; $u_{5,7}=u_{5,6}$, namely, $u_{5,7}=-29/(2\times11\times37)$.

Further calculation reveals that: for sub-groups 8, 9, 10, ..., 16, the values of u and v do not change any more.

By analogy, u and v of all sub-groups of other sequence groups may be obtained. Calculation reveals that: for any sub-group i of the sequence group 5, $v_{5,i}=1/(2\times 11)$. Based on the foregoing calculation, the sequences that meet $u_{5,i} \leq (r_i/N_i-5/N_1) \leq v_{5,i}$ are selected and included into the sub-group i of the sequence group 5, where the sequence is represented by a basic sequence index. Thus the following table is generated:

TABLE 9

| | |
|---|---|
| $N_1 = 11$ group number k | 5 |
| $N_2 = 23$ basic sequence index $r_2$ | 10, 11 |
| $N_3 = 37$ basic sequence index $r_3$ | 16, 17, 18 |
| $N_4 = 47$ basic sequence index $r_4$ | 20, 21, 22, 23 |
| $N_5 = 59$ basic sequence index $r_5$ | 25, 26, 27, 28, 29 |
| $N_6 = 71$ basic sequence index $r_6$ | 30, 31, 32, 33, 34, 35 |
| $N_7 = 97$ basic sequence index $r_7$ | 41, 42, 43, 44, 45, 46, 47, 48 |
| $N_8 = 107$ basic sequence index $r_8$ | 45, 46, 47, 48, 49, 50, 51, 52, 53 |
| $N_9 = 113$ basic sequence index $r_9$ | 48, 49, 50, 51, 52, 53, 54, 55, 56 |
| $N_{10} = 139$ basic sequence index $r_{10}$ | 59, 60, 61, 62, 63, 64, 65, 66, 67, 68, 69 |
| $N_{11} = 179$ basic sequence index $r_{11}$ | 75, 76, 77, 78, 79, 80, 81, 82, 83, 84, 85, 86, 87, 88, 89 |
| $N_{12} = 191$ basic sequence index $r_{12}$ | 81, 82, 83, 84, 85, 86, 87, 88, 89, 90, 91, 92, 93, 94, 95 |
| $N_{13} = 211$ basic sequence index $r_{13}$ | 89, 90, 91, 92, 93, 94, 95, 96, 97, 98, 99, 100, 101, 102, 103, 104, 105 |
| $N_{14} = 239$ basic sequence index $r_{14}$ | 101, 102, 103, 104, 105, 106, 107, 108, 109, 110, 111, 112, 113, 114, 115, 116, 117, 118, 119 |
| $N_{15} = 283$ basic sequence index $r_{15}$ | 119, 120, 121, 123, 124, 125, 126, 127, 128, 129, 130, 131, 132, 133, 134, 135, 136, 137, 138, 139, 140, 141 |
| $N_{16} = 293$ basic sequence index $r_{16}$ | 123, 124, 125, 126, 127, 128, 129, 130, 131, 132, 133, 134, 135, 136, 137, 138, 139, 140, 141, 142, 143, 144, 145, 146 |

The foregoing calculation of $u_{k,i}$, $v_{k,i}$ reveals that: the same $u_{k,i}$, $v_{k,i}$ may be determined when calculated to $N_4=47$ (namely, S={2,3,4}) and $N_{16}=293$ (namely, S=I={2, 3, . . . , 16}). Therefore, the calculation may continue only to the fourth sub-group, namely, S={2,3,4} to obtain u and v of all sub-groups of all sequence groups and reduce the calculation load.

In practice, u and v in use may be quantized according to the foregoing calculation results to achieve the required precision.

In the foregoing embodiment, selection of the n sequences comes in two circumstances:

Preferably, n is 1, namely, in the foregoing example, a sequence that makes $(r_m/N_m-k/N_1)$ the smallest is selected and included into the sub-group m.

Preferably, n is a natural number greater than 1, and the value of n depends on the length difference between sub-group $N_m$ and reference sub-group $N_1$. The sequences corresponding to several basic sequence indexes near $r_m$ th at makes $(r_m/N_m-k/N_1)$ the smallest are included into a sub-group. Generally, such sequences are n sequences closest to the minimum $r_m$, where n depends on the length difference between $N_1, N_m$. For example, if $N_m$ is about $4 \times N_1$, two $r_m$'s may be included into the group. Generally, $n=\lceil N_m/(2N_1) \rceil$ may be selected. In another example, $n=\lfloor N_m/N_1 \rfloor$ may be selected, where $\lfloor z \rfloor$ is the maximum integer not greater than z. In the sequence sub-group in this case, there may be more than one sequence of a certain length. After such allocation in the system, when using the sequence, the user may select any of the allocated n sequences for transmitting, for example, select the sequence that makes $(r_m/N_m-k/N_1)$ the smallest, second smallest, and so on.

In the foregoing embodiment, n sequences are selected, where n is preferably determined by the sequence group k and sub-group i. For example, $n \leq Q$, where Q is the quantity of sequences that meet $u_{k,i} \leq (r_i/N_i-c_k/N_{p1}) \leq v_{k,i}$, $N_{p1}$ is the length of the reference sub-group sequence, and $c_k$ is the basic sequence index of the sequence with a length of $N_{P_1}$ determined by the sequence group k. $u_{k,i}=-1/(2N_1)$, $v_{k,i}=1/(2N_1)$, or $u_{k,i}=-1/(2N_1)+1/(4N_2)$, $v_{k,i}=1/(2N_1)-1/(4N_2)$, or $u_{k,i}=-\frac{1}{2}^\theta$, $v_{k,i}=\frac{1}{2}^\theta$, and so on, where θ is an integer. If $u_{k,i}$ and $v_{k,i}$ are relatively small, for example, $u_{k,i}=-1/(2N_1)+1/(4N_2)$ and $v_{k,i}=1/(2N_1)-1/(4N_2)$ the correlation between any two sequences of different sequence groups is ensured to be low.

In the foregoing embodiments, the sequence groups may be generated for the sequences corresponding to partial instead of all modes of occupying time frequency resources in the system. For example, the modes of occupying time frequency resources may be divided into multiple levels according to the length of the sequence. Each level includes sequences in a certain length range. For the sequences at each level, the sequence groups are generated and allocated, as described above.

Specifically, the sequence groups may be allocated dynamically, namely, the sequence in use varies with time or other variables; or the sequence groups are allocated statically, namely, the sequence in use is constant. More specifically, the static allocation mode may be used alone, or the dynamic allocation mode is used alone, or both the dynamic allocation mode and the static allocation mode are used, as detailed below:

Preferably, if few radio resources are occupied by the sequence, the sequence groups are allocated dynamically. That is because the sequent length is small in this circumstance, and there are fewer sequence groups. For example, as regards the method of "hopping" a sequence group: in the foregoing embodiment taking the Zadoff-Chu sequence as an example, a serial number $(r_1)$ of a reference sequence group is selected randomly in the pseudo random mode at the time of transmitting the pilot frequency, and then the sequence with the index $r_k$ in the sub-group of the same sequence group is calculated out according to the foregoing selection mode.

Preferably, if many radio resources are occupied by the sequence, the sequence groups are allocated statically. For example, in the foregoing embodiment taking the Zadoff-Chu sequence as an example, if the quantity (N) of sequence groups meets the need, the N sequence groups are allocated to each cell, which meets the requirements of averaged interference between cells without changing with time. Preferably, the radio resources occupied in the system may be divided into two levels. One level is about the sequences that occupy many radio resources, where different sequence groups are allocated statically; the other level is about the sequences that occupy few radio resources, where the sequence groups allocated in the dynamic pseudo random mode. For example, if a sequence occupies more than 144 sub-carriers, the sequence length is generally greater than or equal to 144, and different sequence groups are allocated statically; if the sequences in each sequence group correspond to radio resources of less than 144 sub-carriers, the sequence length is generally less than 144, and the sequence groups are allocated in the dynamic pseudo random mode.

If a sub-group contains multiple sequences, including basic sequences and the sequences of different time cyclic shifts, the sequences may be allocated not only to different users, but also to different cells, for example, different sectors under a base station. Particularly, if a cell needs more sequences, for example, if multi-antenna transmitting is supported, each antenna needs to have a different sequence. In this case, the minimum length of the sequence in use may be limited to increase the quantity of basic sequences in the sub-group. Therefore, more basic sequences in the sub-group or more cyclic shifts of the basic sequences may be allocated to the cell. Further, if the sub-group in the sequence group has multiple sequences, the sequence groups may be further grouped and allocated to different cells, users or channels.

The aforementioned sequences are not limited to Zadoff-Chu sequences, and may be Gauss sequences, other CAZAC sequences, basic sequences, and/or deferred sequences of CAZAC sequences.

Embodiment 2

Figure 4:
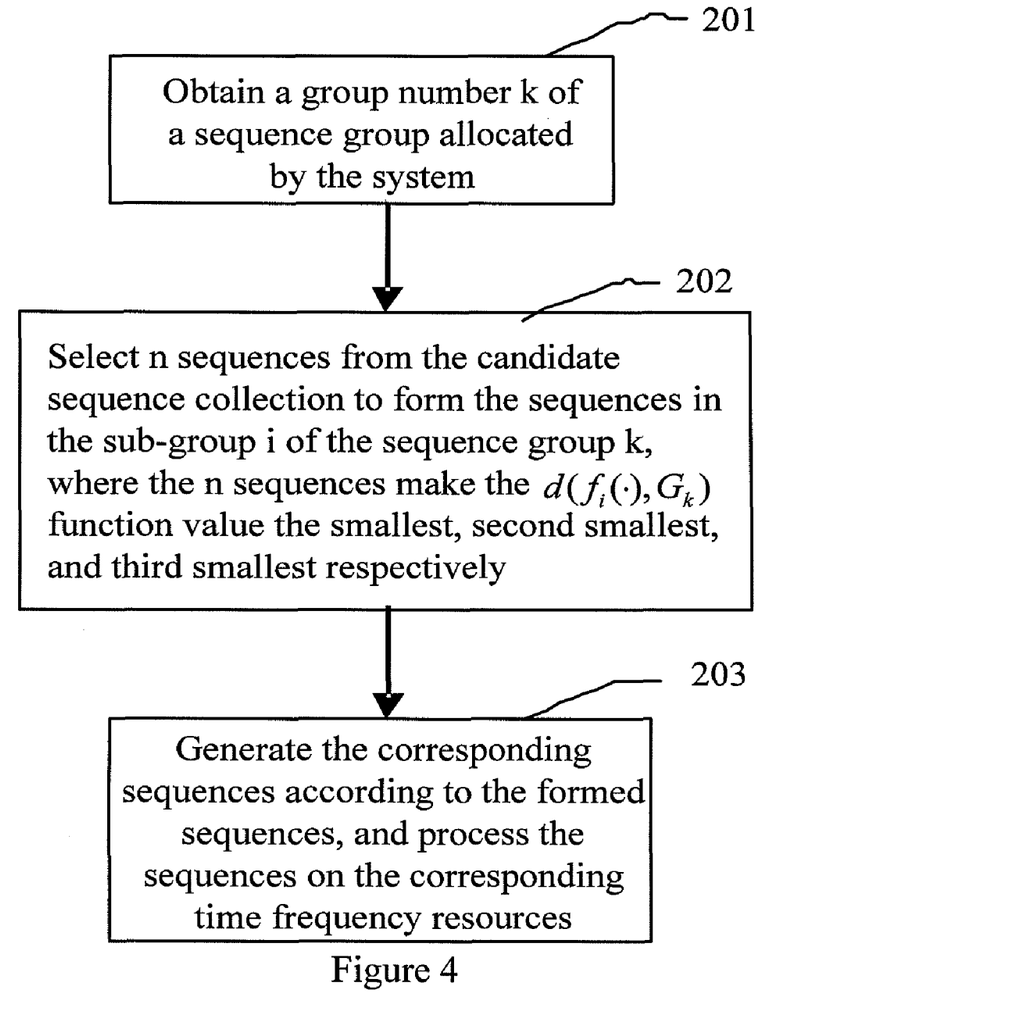
FIG. 4 is a flowchart of a sequence processing method in an embodiment of the present application.

Corresponding to the aforementioned method for allocating sequence groups to cells in a specific selection mode in a network, a method for processing communication sequences is described. As shown in FIG. 4, the process of the method includes:

Step 201: The group number k of the sequence group allocated by the system is obtained.

Step 202: N (n is a natural number) sequences are selected from the candidate sequence collection to form sequences in the sub-group i (i is a serial number of the sub-group) in the sequence group k, where the n sequences make the $d(f_i(\cdot), G_k)$ function value the smallest, second smallest, and third smallest respectively, $d(a,b)$ is a two variables function, $G_k$ is a variable determined by the group number k, $f_i(\cdot)$ is a function corresponding to the sub-group i determined by the system, and the domain of the function is the candidate sequence collection corresponding to the sub-group i.

Step 203: The corresponding transmitting sequences are generated according to the formed sub-group i, and the sequences on the corresponding time frequency resources are processed.

Processing of communication sequences includes transmitting and receiving of communication sequences. Receiving of communication sequences includes calculation related to the generated sequences and received signals. Generally, the specific receiving operations include the calculation for obtaining channel estimation or time synchronization.

The aforementioned sequences are not limited to Zadoff-Chu sequences, and may be Gauss sequences, other CAZAC sequences, basic sequences, and/or shifted sequences of CAZAC sequences. The processing of sequences may be frequency domain processing or time domain processing. The functions in the foregoing method may be consistent with the functions in the foregoing allocation method, and are not repeated further.

Taking the Zadoff-Chu sequence as an example, if the function $d(a,b)$ is $d(a,b)=|(a-b)|$, for the sub-group m, the sequence that makes the $|r_m/N_m-k/N_1|$ value the smallest is selected and included into the sequence group k, thus ensuring higher correlation between sequences and reducing correlation between groups.

In practice, working out the $r_m$ indexes that make $|r_m/N_m-k/N_1|$ the smallest, second smallest, . . . , may induce a general method. That is, with an known integer $N_1, N_2$, e, the integer f needs to make the $|e/N_1-f/N_2|$ value the smallest. Evidently, f is the integer w closest to $e \cdot N_2/N_1$, namely, the $\lfloor e \cdot N_2/N_1 \rfloor$ value rounded down or the $\lceil e \cdot N_2/N_1 \rceil$ value rounded up. The fewer n sequences are $w \pm 1, w \pm 2, \ldots$ The transmitter and the receiver may obtain the data through calculation in this way rather than store the data.

Still taking the Zadoff-Chu sequence as an example, if the function $d(a,b)$ is $|(a-b) \bmod m_{k,i}|$, the sub-group numbered $p_1$ serves as a reference sub-group, $N_{p_1}$ is the length of the reference sub-group sequence, $c_k$ is the basic sequence index of the sequence with a length of $N_{p_1}$ determined by the sequence group k, $N_i$ is the length of the sequence of the sub-group i, and $r_i$ is the basic sequence index of the sequence with a length of $N_i$ determined by the sequence group k, then, $|(a-b) \bmod m_{k,i}|=|(r_i/N_i-c_k/N_{p_1}) \bmod m_{k,i}|$. Particularly, $N_{p_1}=N_1$ and $c_k=k$ may be selected. For the sub-group i=q in the sequence group k, the sequence that makes $|(r_q/N_q-k/N_1) \bmod m_{k,q}|$ the smallest is selected and included into the sequence group k. Therefore, the selected sequence is the most correlated with the sequence of the reference length in the same sequence group, the correlation of the sequences between different groups is further reduced, and the inter-group interference is weaker.

In practice, working out the index $r_q$ that makes $|(r_q/N_q-k/N_1) \bmod m_{k,q}|$ the smallest may induce a general method, namely, $r_q=B^{-1} \times \text{round}(B \times k \times N_q/N_1)$, where $B=1/m_{k,q}$, $B^{-1}$ is a natural number that meets $B \times B^{-1} \bmod N_q=1$, and round(z) is an integer closest to z.

A detailed description is given below through examples. With a known integer $N_1, N_2$, e, if $m_{k,q}=1$, then the integer f needs to make the $|(e/N_1-f/N_2) \bmod 1|$ value the smallest. Evidently, f is the integer w closest to $e \cdot N_2/N_1$, namely, the $\lfloor e \cdot N_2/N_1 \rfloor$ value rounded down or the $\lceil e \cdot N_2/N_1 \rceil$ value rounded up. If $m_{k,q}=\frac{1}{2}$, then the integer f needs to make the $|(e/N_1-f/N_2) \bmod \frac{1}{2}|$ value the smallest. f is $$w \cdot \frac{1+N_2}{2} \text{ modul } o\ N_2,$$

namely, $$w \cdot \frac{1+N_2}{2} \bmod N_2,$$

where w is an integer closest to $2e \cdot N_2/N_1$, namely, the $\lfloor 2e \cdot N_2/N_1 \rfloor$ value rounded down or the $\lceil 2e \cdot N_2/N_1 \rceil$ value rounded up. If $m_{k,q}=\frac{1}{3}$, then the integer f needs to make the $|(e/N_1-f/N_2) \bmod \frac{1}{3}|$ value the smallest. When $N_2 \bmod 3=0$, f is w/3; when $N_2 \bmod 3=1$, f is $$w \cdot \frac{1-N_2}{3} \bmod N_2;$$

when $N_2 \bmod 3=2$, f is $$w \cdot \frac{1+N_2}{3} \bmod N_2,$$

where w is an integer closest to $3e \cdot N_2/N_1$, namely, the $\lfloor 3e \cdot N_2/N_1 \rfloor$ value rounded down or the $\lceil 3e \cdot N_2/N_1 \rceil$ value rounded up. If $m_{k,q}=\frac{1}{4}$, then the integer f needs to make the $|(e/N_1-f/N_2)$ modu $\frac{1}{4}|$ value the smallest. When $N_2 \bmod 2=0$, f is $w/4$; when $N_2 \bmod 4=1$, f is $$w \cdot \frac{1+N_2}{4} \bmod N_2,$$

when $N_2 \bmod 4=3$, f is $$w \cdot \frac{1-N_2}{4} \bmod N_2;$$

where w is an integer closest to $4e \cdot N_2/N_1$, namely, the $\lfloor 4e \cdot N_2/N_1 \rfloor$ value rounded down or the $\lceil 4e \cdot N_2/N_1 \rceil$ value rounded up.

To sum up, through $m_{k,q}$ storage and simple calculation, the sequences in the sub-group q in the sequence group k are obtained. According to the inherent features of $m_{k,q}$, the $m_{k,q}$ storage may be simplified, as detailed below:

$m_{k,q}$ of the sub-group q is symmetric between different sequence groups k, namely, $m_{k,q}=m_{T-k,q}$, where T is the total number of sequence groups. Therefore, if $m_{k,q}$ in the case of $1 \leq k \leq T/2$ is pre-stored, $m_{k,q}$ in the case of $1 \leq k \leq T$ can be obtained; or, if $m_{k,q}$ in the case of $T/2 < k \leq T$ is pre-stored, $m_{k,q}$ in the case of $1 \leq k \leq T$ can also be obtained.

If $N_q \geq L_r$, it is appropriate that $m_{k,q}=1$, where $N_q$ is the sequence length of the sub-group q, and $L_r$ is determined by the reference sub-group sequence length $N_{p_1}$. Specifically, for $N_{p_1}=N_1=31$, $L_r=139$. If $N_q=139$ or above, then $m_{k,q}=1$. After cyclic extension of the sequence, $L_r=191$. Therefore, when $N_q=191$ or above, $m_{k,q}=1$.

The specific values of $m_{k,q}$ corresponding to the sub-group q in the sequence group k may be stored. Specifically, x bits may be used to represent W different values of $m_{k,q}$, where $2^{x-1}<W \leq 2^x$; for each $m_{k,q}$, the x bits that represent the specific values of $m_{k,q}$ are stored. Alternatively, the value selection mode of $m_{k,q}$ may also be stored. For example, when $N_q \geq L_r$, $m_{k,q}=1$.

In the foregoing embodiment, after the resource occupied by the sequence is determined, the sequence of the sub-group corresponding to the resource of the current group may be generated in real time according to the selection mode, without the need of storing. The implementation is simple.

It is understandable to those skilled in the art that all or part of the steps in the foregoing embodiments may be implemented by hardware instructed by a program. The program may be stored in a computer-readable storage medium such as ROM/RAM, magnetic disk and compact disk, and the steps covered in executing the program are consistent with the foregoing steps 201-203.

Embodiment 3

Figure 5:
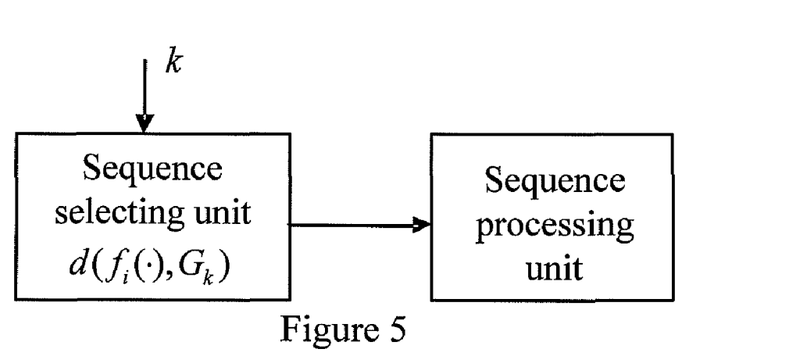
FIG. 5 shows a structure of a sequence processing apparatus in an embodiment of the present application.

As shown in FIG. 5, an apparatus for processing communication sequences by using the foregoing communication sequence processing method includes:

a sequence selecting unit, adapted to: obtain a group number k of a sequence group allocated by the system, and select n (n is a natural number) sequences from a candidate sequence collection to form sequences in a sub-group i (i is a serial number of the sub-group) in the sequence group k (k is the serial number of the sequence group), where the n sequences make the $d(f_i(\cdot), G_k)$ function value the smallest, second smallest, and third smallest respectively, d(a,b) is a two variables function, $G_k$ is a variable determined by the group number k, $f_i(\cdot)$ is a function corresponding to the sub-group i determined by the system, and the domain of the function is the candidate sequence collection corresponding to the sub-group i; and a sequence processing unit, adapted to: select or generate the corresponding sequences according to the sequences in the formed sub-group i, and process the sequences on the time frequency resources corresponding to the sub-group i.

Figure 6:
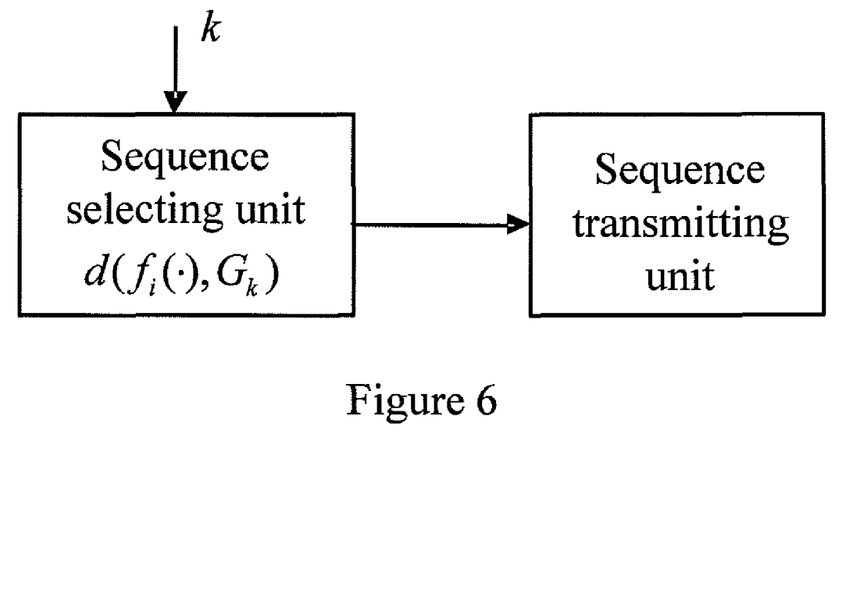
FIG. 6 shows a structure of a sequence processing apparatus in an embodiment of the present application.

Specifically, as shown in FIG. 6, the sequence processing unit is a sequence transmitting unit adapted to generate the corresponding sequences according to the formed sequences and transmit the sequences on the corresponding time frequency resources. In this case, the communication sequence processing apparatus is a communication sequence transmitting apparatus.

Figure 7:
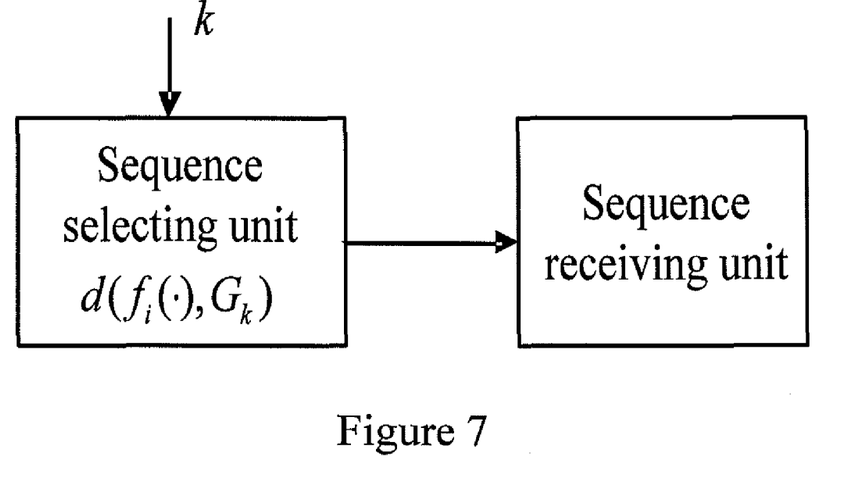
FIG. 7 shows a structure of a sequence processing apparatus in another embodiment of the present application.

Specifically, as shown in FIG. 7, the sequence processing unit may be a sequence receiving unit adapted to generate the corresponding sequences according to the formed sequences and receive the sequences on the corresponding time frequency resources. In this case, the communication sequence processing apparatus is a communication sequence receiving apparatus. The receiving processing generally includes calculation related to the generated sequences and received signals. Generally, the specific receiving operations include the calculation for obtaining channel estimation or time synchronization.

The relevant functions and specific processing in the communication sequence processing apparatus are consistent with those in the forgoing allocation method and processing method, and are not repeated further. The aforementioned sequences are not limited to Zadoff-Chu sequences, and may be Gauss sequences, other CAZAC sequences, basic sequences, and/or deferred sequences of CAZAC sequences. The processing of sequences may be frequency domain processing or time domain processing.

In the foregoing communication sequence processing apparatus, the sequence selecting unit selects a sequence compliant with the interference requirement directly in a specific selection mode, without the need of storing the lists about the correspondence of sequences, thus saving communication resources as against the conventional art.

Although exemplary embodiments have been described through the application and accompanying drawings, the claims are not limited to such embodiments. It is apparent that those skilled in the art can make various modifications and variations to the embodiments without departing from the spirit and scope of the claims.

What is claimed is:

1. A method for allocating sequences in a communication system, comprising:
   dividing, by the communication system having a processor, sequences in a sequence group into multiple sub-groups, each sub-group corresponding to a mode of occupying time frequency resources;

selecting, sequences from a candidate sequence collection corresponding to each sub-group to form the sequences in the sub-group by: the sequences in a sub-group i in a sequence group k being composed of n sequences in the candidate sequence collection, wherein n is a natural number, the n sequences making a $|r_i/N_i - c_k/N_{P_1}|$ or $|(r_i/N_i - c_k/N_{P_1})$ modu $m_{k,i}|$ function value a smallest, a second smallest, until an $n^{th}$ smallest respectively, wherein i is a serial number of the sub-group, k is a serial number of the sequence group, $N_{P_1}$ is the length of a reference sub-group sequence, $c_k$ is a basic sequence index of a sequence with a length of $N_{P_1}$ determined by the sequence group k;

wherein $r_i$ is a basic sequence index in the candidate sequence collection, and $N_i$ is the length of a sequence in the candidate sequence collection;

wherein $m_{k,i}$ is a variable dependent on the group number k and the sub-group number i; and allocating, by the communication system having the processor, the sequence group to a cell, a user equipment or a channel or a base station.

2. The method of claim 1, wherein: the sequences correspond to at least one of: Zadoff-Chu sequences or Gauss sequences.

3. The method of claim 2, wherein $n = \lfloor N_i/N_{P_1} \rfloor$, $\lfloor z \rfloor$ represents a maximum integer not greater than z.

4. The method of claim 1, further comprising:
making $r_i$ an integer value of $c_k \cdot N_i/N_{P_1}$ rounded up or down, which makes the function $|r_i/N_i - c_k/N_{P_1}|$ the smallest value.

5. A method for processing sequences in a communication system, comprising:

obtaining, by a cell or a base station or a user equipment, a group number k of sequence group allocated by the system;

selecting n sequences from a candidate sequence collection to form sequences in a sub-group i in a sequence group k;

the n sequences making a $|r_i/N_i - c_k/N_{P_1}|$ or $|(r_i/N_i - c_k/N_{P_1})$ modu $m_{k,i}|$ function value a smallest, a second smallest, until an $n^{th}$ smallest respectively;

wherein n is a natural number, i is a serial number of the sub-group; wherein $N_{P_1}$ is the length of a reference sub-group sequence, $c_k$ is a basic sequence index of a sequence with a length of $N_{P_1}$ determined by the sequence group k; wherein $r_i$ is a basic sequence index in the candidate sequence collection, and $N_i$ is the length of a sequence in the candidate sequence collection; wherein $m_{k,i}$ is a variable dependent on the group number k and the sub-group number i;

generating, by the cell or the base station or the user equipment, corresponding sequences according to the sequences in the formed sub-group; and communicating according to the sequences on time frequency resources corresponding to the sub-group i.

6. The method of claim 5, wherein: the sequences correspond to at least one of: Zadoff-Chu sequences or Gauss sequences.

7. The method of claim 6, wherein $n = \lfloor N_i/N_{P_1} \rfloor$, $\lfloor z \rfloor$ represents a maximum integer not greater than z.

8. The method of claim 5, wherein $m_{k,i} = 1/B$, and wherein B is a natural number.

9. The method of claim 8, further comprising:
pre-storing $m_{k,i}$ ($1 \leq k \leq T/2$) corresponding to k and i.

10. The method of claim 8, further comprising:
pre-storing $m_{k,i}$ ($T/2 < k \leq T$) corresponding to k and i, wherein T is the total quantity of sequence groups.

11. The method of claim 8, wherein: if $N_i \geq L_r$, then $m_{k,i} = 1$ wherein $N_i$ is the length of a sequence in the candidate sequence collection corresponding to the sub-group i, and $L_r$ is determined by a reference sub-group sequence length $N_{P_1}$.

12. The method of claim 8, wherein the basic sequence index $r_i = B^{-1} \times \text{round}(B \times c_k \times N_i/N_{P_1})$ makes a function d(a,b) value the smallest, where $B^{-1}$ is a natural number that meets $B \times B^{-1}$ mod $N_i = 1$ and round(z) represents an integer closest to z.

13. The method of claim 5, wherein the function $|r_i/N_i - c_k/N_{P_1}|$ or $|(r_i/N_i - c_k/N_{P_1})$ modu $m_{k,i}|$ varies between at least one of: different sequence groups, or different sub-groups of one sequence group.

14. The method of claim 5, further comprising:
making $r_i$ an integer value of $k \cdot N_i/N_1$ rounded up or down, which makes the function $|r_i/N_i - c_k/N_{P_1}|$ the smallest value.

15. A sequence processing apparatus, comprising:

a sequence selecting unit configured to: obtain a group number k of a sequence group allocated by a system, and select n sequences from a candidate sequence collection to form sequences in a sub-group i in the sequence group k, wherein the n sequences make a $|r_i/N_i - c_k/N_{P_1}|$ or $|(r_i/N_i - c_k/N_{P_1})$ modu $m_{k,i}|$ function value a smallest, a second smallest, until an $n^{th}$ smallest respectively, wherein i is a serial number of the sub-group, k is a serial number of the sequence group, $N_{P_1}$ is the length of a reference sub-group sequence, $c_k$ is a basic sequence index of a sequence with a length of $N_{P_1}$ determined by the sequence group k;

wherein $r_i$ is a basic sequence index in the candidate sequence collection, and $N_i$ is the length of a sequence in the candidate sequence collection;

wherein $m_{k,i}$ is a variable dependent on the group number k and the sub-group number i; and a sequence processing unit configured to: generate corresponding sequences according to the sequences in the formed sub-group i, and process according to the sequences on time frequency resources corresponding to the sub-group i.

16. The sequence processing apparatus of claim 15, wherein:
the sequence processing unit is a sequence communicating unit configured to generate the corresponding sequences according to the formed sequences and communicate according to the sequences on the corresponding time frequency resources.

* * * * *